US009232346B2

(12) United States Patent
Guo et al.

(10) Patent No.: US 9,232,346 B2
(45) Date of Patent: Jan. 5, 2016

(54) PROXIMITY INFORMATION REGISTRATION METHOD, QUERY METHOD, AND USER EQUIPMENT

(71) Applicant: HUAWEI TECHNOLOGIES CO., LTD., Shenzhen, Guangdong (CN)

(72) Inventors: Yali Guo, Shenzhen (CN); Weihua Zhou, Shenzhen (CN); Wanqiang Zhang, Beijing (CN); Xiaobo Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/501,514

(22) Filed: Sep. 30, 2014

(65) Prior Publication Data
US 2015/0017917 A1 Jan. 15, 2015

Related U.S. Application Data

(63) Continuation of application No. PCT/CN2013/073210, filed on Mar. 26, 2013.

(30) Foreign Application Priority Data

Apr. 13, 2012 (CN) .......................... 2012 1 0108791

(51) Int. Cl.
H04B 5/00 (2006.01)
H04B 7/00 (2006.01)
(Continued)

(52) U.S. Cl.
CPC ............. *H04W 4/008* (2013.01); *H04W 4/023* (2013.01); *H04W 8/005* (2013.01); *H04W 72/005* (2013.01)

(58) Field of Classification Search
CPC ...................................... H04W 4/008
USPC .................... 455/41.1, 414, 2, 517, 518, 519
See application file for complete search history.

(56) References Cited

U.S. PATENT DOCUMENTS

2007/0142036 A1* 6/2007 Wikman ............... H04W 88/04
455/414.1
2007/0159301 A1* 7/2007 Hirt ....................... H04W 12/02
340/10.1
(Continued)

FOREIGN PATENT DOCUMENTS

CN 101371603 2/2009
CN 101442462 5/2009
(Continued)

OTHER PUBLICATIONS

International Search Report mailed Jul. 4, 2013, in corresponding International Patent Application No. PCT/CN2013/073210.
(Continued)

Primary Examiner — Tilahun B Gesesse
(74) Attorney, Agent, or Firm — Staas & Halsey LLP

(57) ABSTRACT

The present invention provides a proximity information registration method, a query method, and a user equipment. The proximity information registration method includes: sending, by a first user equipment, a proximity service request to a proximity service server, where the proximity service request sent by the first user equipment carries an equipment identifier of the first user equipment; monitoring and obtaining, by the first user equipment, broadcast information of a second user equipment which is broadcast by the second user equipment; and registering the broadcast information of the second user equipment with the proximity service server, so that the proximity service server converts the broadcast information of the second user equipment into an equipment identifier of the second user equipment according to a correspondence between the equipment identifier of the second user equipment and the broadcast information of the second user equipment stored by the proximity service server.

20 Claims, 16 Drawing Sheets

(51) Int. Cl.
*H04M 3/42* (2006.01)
*H04W 4/00* (2009.01)
*H04W 8/00* (2009.01)
*H04W 72/00* (2009.01)
*H04W 4/02* (2009.01)

(56) References Cited

U.S. PATENT DOCUMENTS

| | | | |
|---|---|---|---|
| 2007/0286136 A1* | 12/2007 | Rittle | H04W 8/005 370/338 |
| 2009/0138921 A1 | 5/2009 | Miyata | |
| 2010/0039992 A1 | 2/2010 | Prakash et al. | |
| 2010/0061294 A1 | 3/2010 | Proctor, Jr. et al. | |
| 2010/0332668 A1 | 12/2010 | Shah et al. | |
| 2011/0083111 A1 | 4/2011 | Forutanpour et al. | |
| 2012/0008526 A1 | 1/2012 | Borghei | |
| 2012/0064887 A1 | 3/2012 | Shobatake | |
| 2013/0177006 A1 | 7/2013 | Baek et al. | |
| 2013/0214909 A1* | 8/2013 | Meijers | H04W 4/008 340/10.5 |
| 2013/0343283 A1 | 12/2013 | Laroia et al. | |

FOREIGN PATENT DOCUMENTS

| | | | |
|---|---|---|---|
| CN | 102006594 | 4/2011 | |
| CN | 102187714 | 9/2011 | |
| WO | WO 2004/004395 A1 * | 1/2004 | H04W 8/005 |
| WO | 2010/022008 A1 | 2/2010 | |
| WO | 2012/015237 | 2/2012 | |

OTHER PUBLICATIONS

Extended European Search Report dated Mar. 6, 2015 in corresponding European Patent Application No. 13775162.4.
PCT International Search Report and Written Opinion of the International Searching Authority dated Jul. 4, 2013 in corresponding International Patent Application No. PCT/CN2013/073210.
Chinese Office Action dated Sep. 15, 2015 in corresponding Chinese Patent Application No. 201210108791.0.

* cited by examiner

PROXIMITY INFORMATION REGISTRATION METHOD, QUERY METHOD, AND USER EQUIPMENT

CROSS-REFERENCE TO RELATED APPLICATION

This application is a continuation of International Application No. PCT/CN2013/073210, filed on Mar. 26, 2013, which claims priority to Chinese Patent Application No. 201210108791.0, filed on Apr. 13, 2012, both of which are hereby incorporated by reference in their entireties.

TECHNICAL FIELD

The present invention relates to communications technologies, and in particular, to a proximity information registration method, a query method, and a user equipment.

BACKGROUND

As social applications are extensively used, a proximity discovery function becomes increasingly important. For example, users wish to know presence or absence of their friends in the vicinity in a timely manner. The proximity discovery function makes people's life and work more convenient. For example, after a user arrives at an office, the user can use the proximity discovery function to quickly know which colleagues will soon arrive at the office.

A method for proximity discovery provided by the prior art is implemented based on an absolute position of a user equipment (User Equipment, hereinafter briefly referred to as UE), where judgment for proximity discovery is mainly based on a cell identity. Therefore, if the radius of a cell is large, an error of a distance between UEs will be enlarged; and it is possible that two UEs close to each other but belonging to two neighboring cells are determined to fall beyond a proximity range. Therefore, the method provided by the prior art has a large error and low accuracy in proximity discovery.

In addition, the method provided by the prior art is implemented by an application server in a network. The network of an operator provides only a pipeline function for information transmission between a user equipment and the application server. Although the network of the operator undertakes enormous network resource overheads for a proximity discovery service, the operator cannot benefit from this service.

SUMMARY

The present invention provides a proximity information registration method, a query method, and a user equipment, so as to implement a service of discovering a proximate user under network control.

One aspect of the present invention provides a proximity information registration method, including:

sending, by a first user equipment, a proximity service request to a proximity service server, where the proximity service request sent by the first user equipment carries an equipment identifier of the first user equipment;

after the first user equipment receives a success response sent by the proximity service server with respect to the proximity service request, monitoring and obtaining, by the first user equipment, broadcast information of a second user equipment which is broadcast by the second user equipment; and registering, by the first user equipment, the broadcast information of the second user equipment with the proximity service server, so that the proximity service server converts the broadcast information of the second user equipment into an equipment identifier of the second user equipment according to a correspondence between the equipment identifier of the second user equipment and the broadcast information of the second user equipment stored by the proximity service server and stores the equipment identifier of the second user equipment into a proximate equipment identifier list of the first user equipment.

Another aspect of the present invention provides a proximity information registration method, including:

receiving, by a proximity service server, a proximity service request sent by a first user equipment, where the proximity service request sent by the first user equipment carries an equipment identifier of the first user equipment;

sending, by the proximity service server, a success response corresponding to the proximity service request to the first user equipment, and receiving broadcast information of a second user equipment which is monitored and obtained by the first user equipment and sent by the first user equipment; and converting, by the proximity service server, the broadcast information of the second user equipment into an equipment identifier of the second user equipment according to a correspondence between the equipment identifier of the second user equipment and the broadcast information of the second user equipment stored by the proximity service server, and storing the equipment identifier of the second user equipment into a proximate equipment identifier list of the first user equipment.

Still another aspect of the present invention provides a proximity information query method, including:

receiving, by a proximity service server, an equipment identifier sent by an application server, and sending information of a proximate equipment which is stored by the proximity service server and corresponding to the equipment identifier to the application server; or receiving, by a proximity service server, an equipment identifier sent by a first user equipment, and sending information of a proximate equipment which is stored by the proximity service server and corresponding to the equipment identifier to the first user equipment.

Still another aspect of the present invention provides a proximity information query method, including:

sending, by a first user equipment, an equipment identifier to a proximity service server; and receiving, by the first user equipment, information of a proximate equipment which is sent by the proximity service server and corresponding to the equipment identifier.

Still another aspect of the present invention provides a proximate user discovery method, including:

sending, by an application server, a proximity query request to a proximity service server, where the proximity query request carries an equipment identifier of a user equipment that needs to discover a proximate user;

receiving, by the application server, a proximate equipment identifier list sent by the proximity service server and corresponding to the equipment identifier; and obtaining, by the application server, a user identifier corresponding to the equipment identifier in the proximate equipment identifier list according to a correspondence between the equipment identifier and the user identifier which is stored by the application server, and sending the obtained user identifier to the user equipment.

Still another aspect of the present invention provides a proximate user discovery method, including:

receiving, by a proximity service server, a proximity query request sent by an application server, where the proximity query request carries an equipment identifier of a user equipment that needs to discover a proximate user; and sending, by the proximity service server, a proximate equipment identifier list corresponding to the equipment identifier to the application server, so that the application server obtains a user identifier corresponding to the equipment identifier in the proximate equipment identifier list according to a correspondence between the equipment identifier and the user identifier which is stored by the application server and sends the obtained user identifier to the user equipment.

Still another aspect of the present invention provides a user equipment, including:

a sending module, adapted to send a proximity service request to a proximity service server, where the proximity service request sent by the sending module carries an equipment identifier of the user equipment;

a receiving module, adapted to receive a success response sent by the proximity service server with respect to the proximity service request;

a monitoring module, adapted to monitor and obtain, after the receiving module receives the success response, broadcast information of at least one user equipment which is broadcast by the at least one user equipment other than the user equipment; and a registering module, adapted to register the broadcast information monitored and obtained by the monitoring module with the proximity service server, so that the proximity service server converts the broadcast information of the at least one user equipment into an equipment identifier of the at least one user equipment according to a correspondence between the equipment identifier of the at least one user equipment and the broadcast information of the at least one user equipment stored by the proximity service server and stores the equipment identifier of the at least one user equipment into a proximate equipment identifier list of the user equipment.

Still another aspect of the present invention provides a proximity service server, including:

a first receiving module, adapted to receive a proximity service request sent by a first user equipment, where the proximity service request sent by the first user equipment carries an equipment identifier of the first user equipment, and receive broadcast information of a second user equipment which is monitored and obtained by the first user equipment and sent by the first user equipment;

a first sending module, adapted to send a success response corresponding to the proximity service request to the first user equipment;

a first converting module, adapted to convert the broadcast information of the second user equipment into an equipment identifier of the second user equipment according to a correspondence between the equipment identifier of the second user equipment and the broadcast information of the second user equipment stored by the proximity service server; and a first storing module, adapted to store the equipment identifier of the second user equipment into a proximate equipment identifier list of the first user equipment.

Still another aspect of the present invention provides a proximity service server, including:

an identifier receiving module, adapted to receive an equipment identifier sent by an application server; and an information sending module, adapted to send information of a proximate equipment which is stored by the proximity service server and corresponding to the equipment identifier received by the identifier receiving module to the application server; or the identifier receiving module, adapted to receive an equipment identifier sent by a first user equipment; and the information sending module, adapted to send information of a proximate equipment which is stored by the proximity service server and corresponding to the equipment identifier received by the identifier receiving module to the first user equipment.

Still another aspect of the present invention provides a user equipment, including:

a first sending module, adapted to send an equipment identifier to a proximity service server; and a first receiving module, adapted to receive information of a proximate equipment which is sent by the proximity service server and corresponding to the equipment identifier.

Still another aspect of the present invention provides an application server, including:

a request sending module, adapted to send a proximity query request to a proximity service server, where the proximity query request carries an equipment identifier of a user equipment that needs to discover a proximate user;

a list receiving module, adapted to receive a proximate equipment identifier list sent by the proximity service server and corresponding to the equipment identifier; and an identifier sending module, adapted to obtain a user identifier corresponding to the equipment identifier in the proximate equipment identifier list according to a correspondence between the equipment identifier and the user identifier which is stored by the application server, and send the obtained user identifier to the user equipment.

Still another aspect of the present invention provides a proximity service server, including:

a first receiving module, adapted to receive a proximity query request sent by an application server, where the proximity query request carries an equipment identifier of a user equipment that needs to discover a proximate user; and a first sending module, adapted to send a proximate equipment identifier list corresponding to the equipment identifier to the application server, so that the application server obtains a user identifier corresponding to the equipment identifier in the proximate equipment identifier list according to a correspondence between the equipment identifier and the user identifier which is stored by the application server and sends the obtained user identifier to the user equipment.

Still another aspect of the present invention provides a system for implementing a proximity service, including: a user equipment, a proximity service server, and an application server, where:

the user equipment is adapted to: send a proximity service request to the proximity service server, where the proximity service request sent by the user equipment carries an equipment identifier of the user equipment; and after receiving a success response sent by the proximity service server with respect to the proximity service request, monitor and obtain broadcast information of at least one user equipment which is broadcast by the at least one user equipment other than the user equipment, and register the broadcast information of the at least one user equipment with the proximity service server;

the proximity service server is adapted to: convert the broadcast information of the at least one user equipment into an equipment identifier of the at least one user equipment according to a correspondence between the equipment identifier of the at least one user equipment and the broadcast information of the at least one user equipment stored by the proximity service server, and store the equipment identifier of the at least one user equipment into a proximate equipment identifier list of the user equipment; and receive the equipment identifier of the user equipment which is sent by the application server, and send the proximate equipment identifier list of the user equipment to the application server; and the application server is adapted to obtain a user identifier corresponding to the equipment identifier in the proximate equipment identifier list of the user equipment according to a correspondence between the equipment identifier and the user identifier which is stored by the application server, and send the obtained user identifier to the user equipment.

Still another aspect of the present invention provides a system for implementing a proximity service, including: a user equipment, a mobility management entity, a proximity service server, and an application server, where:

the user equipment is adapted to: send a proximity service request to the mobility management entity, where the proximity service request sent by the user equipment carries an equipment identifier of the user equipment; and after receiving a success response sent by the mobility management entity, monitor and obtain broadcast information of at least one user equipment which is broadcast by the at least one user equipment other than the user equipment, and send the broadcast information of the at least one user equipment to the mobility management entity;

the mobility management entity is adapted to: send a proximity service request to the proximity service server according to the proximity service request sent by the user equipment, and receive a success response sent by the proximity service server with respect to the proximity service request, and send the success response to the user equipment; and receive the broadcast information of the at least one user equipment which is sent by the user equipment, and register the broadcast information of the at least one user equipment with the proximity service server;

the proximity service server is adapted to: convert the broadcast information of the at least one user equipment into an equipment identifier of the at least one user equipment according to a correspondence between the equipment identifier of the at least one user equipment and the broadcast information of the at least one user equipment stored by the proximity service server, and store the equipment identifier of the at least one user equipment into a proximate equipment identifier list of the user equipment; and receive the equipment identifier of the user equipment which is sent by the application server, and send the proximate equipment identifier list of the user equipment to the application server; and the application server is adapted to obtain a user identifier corresponding to the equipment identifier in the proximate equipment identifier list of the user equipment according to a correspondence between the equipment identifier and the user identifier which is stored by the application server, and send the obtained user identifier to the user equipment.

In one aspect, the technical effect of the present invention is as follows: A first user equipment registers broadcast information of a second user equipment with a proximity service server after the first user equipment monitors and obtains the broadcast information of the second user equipment which is broadcast by the second user equipment, and the proximity service server maintains a proximate equipment identifier list of the first user equipment, thereby implementing a proximity discovery service under network control and improving accuracy of proximity discovery.

In another aspect, the technical effect of the present invention is as follows: After a proximity service server receives an equipment identifier, the proximity service server sends information of a proximate equipment corresponding to the equipment identifier to an application server or a first user equipment, thereby implementing a proximity discovery service under network control.

In still another aspect, the technical effect of the present invention is as follows: After an application server sends an equipment identifier of a user equipment that needs to discover a proximate user to a proximity service server, the application server receives a proximate equipment identifier list sent by the proximity service server and corresponding to the equipment identifier, then obtains a user identifier corresponding to the equipment identifier in the proximate equipment identifier list according to a correspondence between the equipment identifier and the user identifier which is stored by the application server, and then sends the obtained user identifier to the user equipment. Therefore, under network control, a user using the user equipment can discover a proximate user using the same application as the user.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
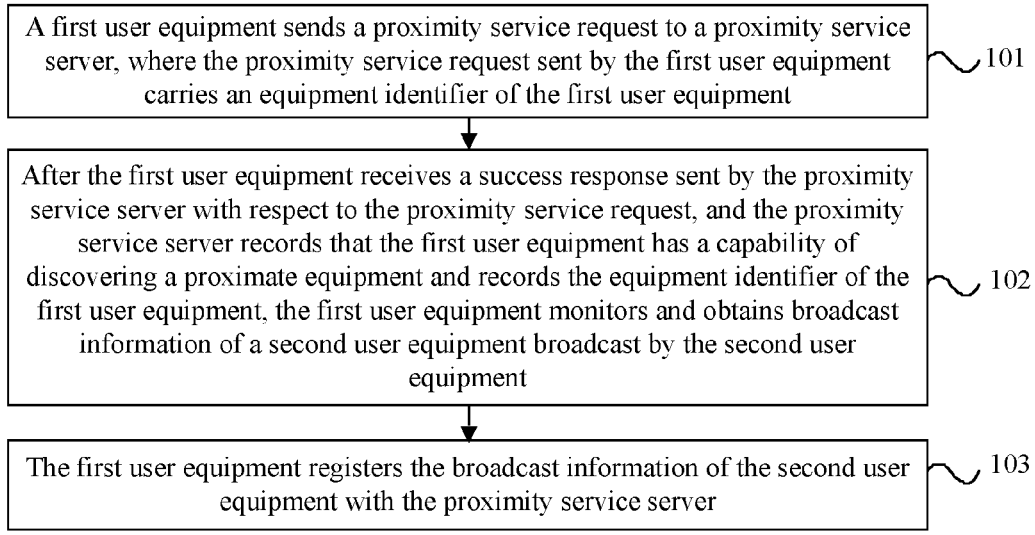
FIG. 1 is a flowchart of an embodiment of a proximity information registration method according to the present invention.

FIG. 1 is a flowchart of an embodiment of a proximity information registration method according to the present invention. As shown in FIG. 1, the proximity information registration method may include:

Step 101: A first user equipment sends a proximity service request to a proximity service server, where the proximity service request sent by the first user equipment carries an equipment identifier of the first user equipment.

In this embodiment, the equipment identifier of the first user equipment may be a mobile subscriber international integrated service digital network number (Mobile Subscriber International Integrated Service Digital Network number, hereinafter briefly referred to as MSISDN), a Session Initiation Protocol uniform resource identifier (Session Initiation Protocol Uniform Resource Identifier, hereinafter briefly referred to as SIP URI) or an Internet Protocol (Internet Protocol, hereinafter briefly referred to as IP) address, or the like, or may also be a newly defined identifier. The present invention does not limit the form of the equipment identifier of the first user equipment as long as the identifier can uniquely identify the first user equipment in the proximity service server.

Step 102: After the first user equipment receives a success response sent by the proximity service server with respect to the proximity service request, the first user equipment monitors and obtains broadcast information of a second user equipment which is broadcast by the second user equipment.

In this embodiment, the proximity service request sent by the first user equipment further carries information indicating that the first user equipment requests to discover a proximate equipment; in this case, when the proximity service request sent by the first user equipment carries the information indicating that the first user equipment requests to discover a proximate equipment, the success response received by the first user equipment may be sent by the proximity service server after the proximity service server determines to allow the first user equipment to use a proximity service.

Specifically, after the first user equipment obtains the broadcast information of the second user equipment, the first user equipment may determine that the second user equipment is a proximate equipment of the first user equipment; or, after the first user equipment obtains the broadcast information of the second user equipment and performs a physical layer interaction with the second user successfully, the first user equipment determines that the second user equipment is a proximate equipment of the first user equipment.

In this embodiment, the broadcast information may be broadcast code (Broadcast Code), and definitely, is not limited by the present invention. The present invention does not limit the specific form of the broadcast information.

Step 103: The first user equipment registers the broadcast information of the second user equipment with the proximity service server, so that the proximity service server converts the broadcast information of the second user equipment into an equipment identifier of the second user equipment according to a correspondence between the equipment identifier of the second user equipment and the broadcast information of the second user equipment stored by the proximity service server and stores the equipment identifier of the second user equipment into a proximate equipment identifier list of the first user equipment.

In this embodiment, the equipment identifier of the second user equipment may be an MSISDN, a SIP URI, or an IP address of the second user equipment, or the like, or may also be a newly defined identifier. The present invention does not limit the form of the equipment identifier of the second user equipment as long as the identifier can uniquely identify the second user equipment in the proximity service server.

The broadcast information of the second user equipment is allocated to the second user equipment and sent to the second user equipment after the proximity service server receives a proximity service request sent by the second user equipment; and the proximity service request sent by the second user equipment carries the equipment identifier of the second user equipment, and the proximity service server stores the correspondence between the equipment identifier of the second user equipment and the broadcast information of the second user equipment.

In this embodiment, the proximity service request sent by the second user equipment further carries information indicating that the second user equipment requests to be discovered by a proximate equipment; in this case, when the proximity service request sent by the second user equipment carries the information indicating that the second user equipment requests to be discovered by a proximate equipment, the broadcast information of the second user equipment is allocated to the second user equipment and sent to the second user equipment by the proximity service server after the proximity service server receives the proximity service request sent by the second user equipment.

In an implementation manner of this embodiment, after step 101, the first user equipment may further receive a broadcast information list of an equipment set to be monitored by the first user equipment, which is sent by the proximity service server.

In the implementation manner, in step 103, the registering, by the first user equipment, the broadcast information of the second user equipment with the proximity service server may be: registering, by the first user equipment, the broadcast information of the second user equipment with the proximity service server after determining that the broadcast information of the second user equipment is broadcast information in the broadcast information list.

In another implementation manner of this embodiment, in step 101, the sending, by a first user equipment, a proximity service request to a proximity service server may be: sending, by the first user equipment, a proximity service request to a mobility management entity, so that the mobility management entity sends a proximity service request to the proximity service server according to the proximity service request sent by the first user equipment.

The sending, by the mobility management entity, a proximity service request to the proximity service server according to the proximity service request sent by the first user equipment may be: when the equipment identifier of the first user equipment which is carried in the proximity service request sent by the first user equipment is a temporary identifier of the first user equipment, after the mobility management entity converts the temporary identifier of the first user equipment into a fixed identifier of the first user equipment, sending, by the mobility management entity, a proximity service request to the proximity service server, where the proximity service request sent by the mobility management entity carries the fixed identifier of the first user equipment.

In the implementation manner, in step 103, the registering, by the first user equipment, the broadcast information of the second user equipment with the proximity service server may be: registering, by the first user equipment, the broadcast information of the second user equipment with the proximity service server through the mobility management entity.

In the implementation manner, after step 101, the first user equipment may further receive a broadcast information list of an equipment set to be monitored by the first user equipment, which is sent by the mobility management entity, where the broadcast information list of the equipment set to be monitored by the first user equipment is sent to the mobility management entity by the proximity service server. Therefore, in step 103, the registering, by the first user equipment, the broadcast information of the second user equipment with the proximity service server may be: registering, by the first user equipment, the broadcast information of the second user equipment with the proximity service server through the mobility management entity after determining that the broadcast information of the second user equipment is broadcast information in the broadcast information list.

In the above embodiment, after the first user equipment monitors and obtains the broadcast information of the second user equipment which is broadcast by the second user equipment, the first user equipment determines that the second user equipment is a proximate equipment of the first user equipment, thereby improving accuracy of proximity discovery and improving user experience; furthermore, the first user equipment registers the broadcast information of the second user equipment with the proximity service server, and the proximity service server maintains the proximate equipment identifier list of the first user equipment, thereby implementing a proximity discovery service under network control; in addition, in this embodiment, the proximity service server allocates broadcast information used for proximate equipment discovery to the user equipment, so that a network can manage and control the proximity discovery service.

Figure 2:
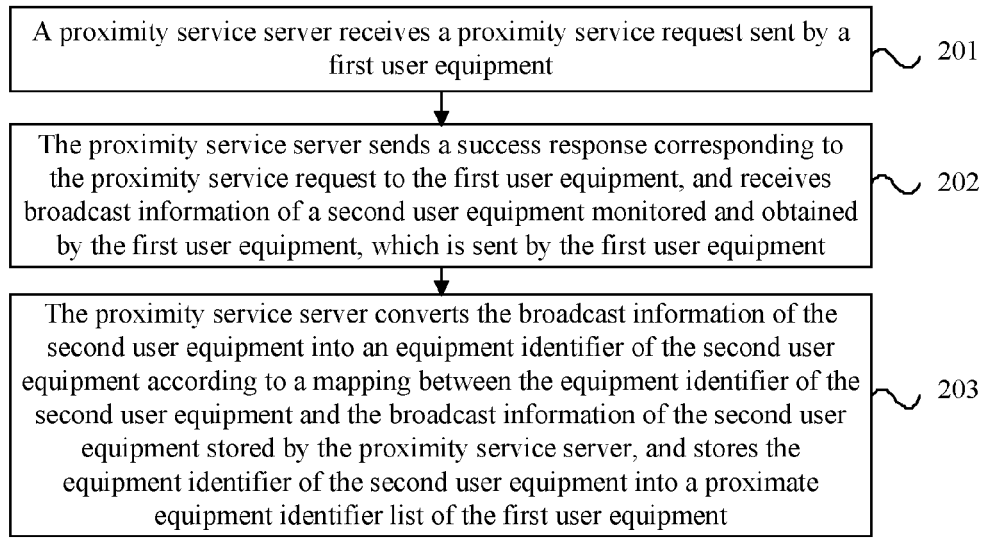
FIG. 2 is a flowchart of another embodiment of a proximity information registration method according to the present invention.

FIG. 2 is a flowchart of another embodiment of a proximity information registration method according to the present invention. As shown in FIG. 2, the proximity information registration method may include:

Step 201: A proximity service server receives a proximity service request sent by a first user equipment, where the proximity service request sent by the first user equipment carries an equipment identifier of the first user equipment.

Specifically, the receiving, by a proximity service server, a proximity service request sent by a first user equipment may be: receiving, by the proximity service server, the proximity service request sent through a mobility management entity by the first user equipment.

Step 202: The proximity service server sends a success response corresponding to the proximity service request to the first user equipment, and receives broadcast information of a second user equipment which is monitored and obtained by the first user equipment and sent by the first user equipment.

Specifically, the sending, by the proximity service server, a success response corresponding to the proximity service request to the first user equipment may be: when the proximity service request sent by the first user equipment carries information indicating that the first user equipment requests to discover a proximate equipment, sending, by the proximity service server, the success response to the first user equipment after the proximity service server determines to allow the first user equipment to use a proximity service.

Specifically, the receiving broadcast information of a second user equipment which is monitored and obtained by the first user equipment and sent by the first user equipment may be: receiving, by the proximity service server, the broadcast information of the second user equipment which is sent through the mobility management entity by the first user equipment.

Step 203: The proximity service server converts the broadcast information of the second user equipment into an equipment identifier of the second user equipment according to a correspondence between the equipment identifier of the second user equipment and the broadcast information of the second user equipment stored by the proximity service server, and stores the equipment identifier of the second user equipment into a proximate equipment identifier list of the first user equipment.

In this embodiment, before the proximity service server converts the broadcast information of the second user equipment into an equipment identifier of the second user equipment according to a correspondence between the equipment identifier of the second user equipment and the broadcast information of the second user equipment stored by the proximity service server, the proximity service server may further receive a proximity service request sent by the second user equipment, where the proximity service request sent by the second user equipment carries the equipment identifier of the second user equipment; then, the proximity service server allocates broadcast information to the second user equipment, stores the correspondence between the equipment identifier of the second user equipment and the broadcast information of the second user equipment, and sends the broadcast information of the second user equipment to the second user equipment.

Specifically, the allocating, by the proximity service server, the broadcast information to the second user equipment may be: allocating, by the proximity service server, the broadcast information to the second user equipment when the proximity service request sent by the second user equipment carries information indicating that the second user equipment requests to be discovered by a proximate equipment.

In an implementation manner of this embodiment, after the proximity service server receives the proximity service request sent by the first user equipment, the proximity service server may further send a broadcast information list of an equipment set to be monitored by the first user equipment to the first user equipment; in this case, the receiving broadcast information of the second user equipment which is monitored and obtained by the first user equipment and sent by the first user equipment may be: receiving, by the proximity service server, broadcast information of the second user equipment which is sent by the first user equipment after the first user equipment determines that the broadcast information of the second user equipment is broadcast information in the broadcast information list.

In another implementation manner of this embodiment, after the proximity service server receives the proximity service request sent by the first user equipment, the proximity service server may further send a broadcast information list of an equipment set to be monitored by the first user equipment to the first user equipment through the mobility management entity; in this case, the receiving, by the proximity service server, broadcast information of the second user equipment which is sent through a mobility management entity by the first user equipment may be: receiving, by the proximity service server, the broadcast information of the second user equipment which is sent through the mobility management entity by the first user equipment after the first user equipment determines that the broadcast information of the second user equipment is broadcast information in the broadcast information list.

In the above embodiment, the proximity service server maintains the proximate equipment identifier list of the first user equipment, thereby implementing a proximity discovery service under network control; in addition, in this embodiment, the proximity service server allocates broadcast information used for proximate equipment discovery to the user equipment, so that a network can manage and control the proximity discovery service.

Figure 3:
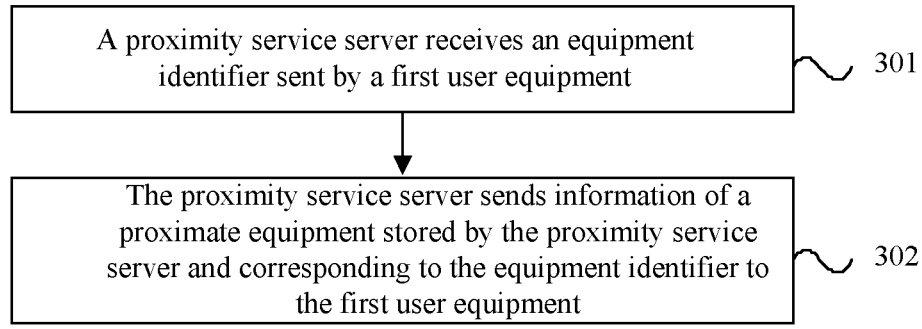
FIG. 3 is a flowchart of an embodiment of a proximity information query method according to the present invention.

FIG. 3 is a flowchart of an embodiment of a proximity information query method according to the present invention. As shown in FIG. 3, the proximity information query method may include:

Step 301: A proximity service server receives an equipment identifier sent by a first user equipment.

Step 302: The proximity service server sends information of a proximate equipment which is stored by the proximity service server and corresponding to the equipment identifier to the first user equipment.

Alternatively, step 301 may be: A proximity service server receives an equipment identifier sent by an application server; in this case, step 302 may be: The proximity service server sends information of a proximate equipment which is stored by the proximity service server and corresponding to the equipment identifier to the application server.

In an implementation manner of this embodiment, the equipment identifier may be an equipment identifier of the first user equipment.

In the implementation manner, step 302 may be: The proximity service server sends a proximate equipment identifier list stored by the proximity service server and corresponding to the equipment identifier of the first user equipment to the application server or first user equipment.

In another implementation manner of this embodiment, the equipment identifier may include an equipment identifier of the first user equipment and an equipment identifier of a second user equipment; in the implementation manner, step 302 may be: The proximity service server feeds back that the second user equipment is a proximate equipment of the first user equipment or that the second user equipment is not a proximate equipment of the first user equipment, to the application server or first user equipment.

Specifically, the proximity service server may query, according to the equipment identifier of the first user equipment and the equipment identifier of the second user equipment, a proximate equipment identifier list stored by the proximity service server and corresponding to the equipment identifier of the first user equipment; if the proximity service server finds the equipment identifier of the second user equipment in the proximate equipment identifier list, the proximity service server feeds back that the second user equipment is a proximate equipment of the first user equipment, that is, the first user equipment and the second user equipment are in a proximity relationship, to the application server or first user equipment; if the proximity service server does not find the equipment identifier of the second user equipment in the proximate equipment identifier list, the proximity service server feeds back that the second user equipment is not a proximate equipment of the first user equipment, that is, the first user equipment and the second user equipment are not in a proximity relationship, to the application server or first user equipment.

In still another implementation manner of this embodiment, in step 301, the receiving, by a proximity service server, an equipment identifier sent by an application server may be: receiving, by the proximity service server, an equipment identifier of the first user equipment and an equipment identifier of at least one user equipment other than the first user equipment that are sent by the application server.

In the implementation manner, before step 302, the proximity service server may further obtain broadcast information of the at least one user equipment corresponding to the equipment identifier of the at least one user equipment according to a correspondence between the equipment identifier and the broadcast information which is stored by the proximity service server, store the broadcast information of the at least one user equipment into a broadcast information list of an equipment set to be monitored by the first user equipment, and send the list to the first user equipment; and then the proximity service server receives broadcast information belonging to the broadcast information list and monitored and obtained by the first user equipment.

Therefore, step 302 may be: The proximity service server obtains, according to the correspondence between the equipment identifier and the broadcast information which is stored by the proximity service server, an equipment identifier corresponding to the broadcast information monitored and obtained by the first user equipment, and sends the equipment identifier corresponding to the broadcast information to the application server, where the equipment identifier corresponding to the broadcast information is an equipment identifier of a proximate equipment of the first user equipment.

In the implementation manner, after the proximity service server stores the broadcast information of the at least one user equipment into a broadcast information list of an equipment set to be monitored by the first user equipment, and sends the list to the first user equipment, the proximity service server may further instruct, according to the equipment identifier of the at least one equipment, the at least one equipment to broadcast its broadcast information.

In the implementation manner, the storing the broadcast information of the at least one user equipment into a broadcast information list of an equipment set to be monitored by the first user equipment, and sending the list to the first user equipment may be: storing, by the proximity service server, the broadcast information of the at least one user equipment into the broadcast information list of the equipment set to be monitored by the first user equipment, and sending the list to the first user equipment through a mobility management entity; in this case, the receiving, by the proximity service server, broadcast information belonging to the broadcast information list and monitored and obtained by the first user equipment may be: receiving, by the proximity service server, broadcast information belonging to the broadcast information list and monitored and obtained by the first user equipment and sent through the mobility management entity by the first user equipment.

Further, after the proximity service server stores the broadcast information of the at least one user equipment into the broadcast information list of the equipment set to be monitored by the first user equipment, and sends the list to the first user equipment through the mobility management entity, the proximity service server may further instruct, according to the equipment identifier of the at least one equipment through the mobility management entity, the at least one equipment to broadcast its broadcast information.

In still another implementation manner of this embodiment, in step 301, the receiving, by a proximity service server, an equipment identifier sent by a first user equipment may be: receiving, by the proximity service server, the equipment identifier sent through a mobility management entity by the first user equipment.

In the implementation manner, the equipment identifier may be an equipment identifier of the first user equipment; in this case, step 302 may be:

The proximity service server sends a proximate equipment identifier list stored by the proximity service server and corresponding to the equipment identifier of the first user equipment to the first user equipment through the mobility management entity.

In addition, the equipment identifier may include an equipment identifier of the first user equipment and an equipment identifier of a second user equipment; in this case, step 302 may be: The proximity service server feeds back that the second user equipment is a proximate equipment of the first user equipment or that the second user equipment is not a proximate equipment of the first user equipment, to the first user equipment through the mobility management entity.

In the above embodiment, after the proximity service server receives the equipment identifier, the proximity service server sends information of a proximate equipment corresponding to the equipment identifier to the application server or first user equipment, thereby implementing a proximity discovery service under network control.

Figure 4:
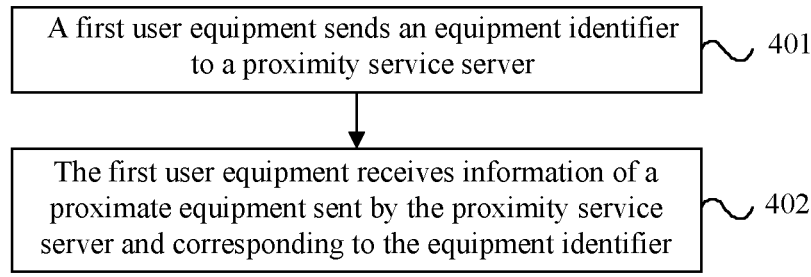
FIG. 4 is a flowchart of another embodiment of a proximity information query method according to the present invention.

FIG. 4 is a flowchart of another embodiment of a proximity information query method according to the present invention. As shown in FIG. 4, the proximity information query method may include:

Step 401: A first user equipment sends an equipment identifier to a proximity service server.

Step 402: The first user equipment receives information of a proximate equipment which is sent by the proximity service server and corresponding to the equipment identifier.

In an implementation manner of this embodiment, the equipment identifier may include an equipment identifier of the first user equipment; in the implementation manner, step 402 may be: The first user equipment receives a proximate equipment identifier list sent by the proximity service server and corresponding to the equipment identifier of the first user equipment.

In another implementation manner of this embodiment, the equipment identifier may include an equipment identifier of the first user equipment and an equipment identifier of a second user equipment; in the implementation manner, step 402 may be: The first user equipment receives information fed back by the proximity service server, where the information indicates that the second user equipment is a proximate equipment of the first user equipment or that the second user equipment is not a proximate equipment of the first user equipment.

Further, before step 402, the first user equipment may receive a broadcast information list of an equipment set to be monitored by the first user equipment, which is sent by the proximity service server; then the first user equipment sends broadcast information belonging to the broadcast information list and monitored and obtained by the first user equipment to the proximity service server, where, the broadcast information list of the equipment set to be monitored by the first user equipment is sent to the first user equipment after the proximity service server receives an equipment identifier of the first user equipment and an equipment identifier of at least one user equipment other than the first user equipment which are sent by an application server, obtains broadcast information of the at least one user equipment corresponding to the equipment identifier of the at least one user equipment according to a correspondence between the equipment identifier and the broadcast information which is stored by the proximity service server, and stores the broadcast information of the at least one user equipment into the broadcast information list of the equipment set to be monitored by the first user equipment.

Specifically, the receiving, by the first user equipment, a broadcast information list of an equipment set to be monitored by the first user equipment, which is sent by the proximity service server may be: receiving, by the first user equipment, the broadcast information list of the equipment set to be monitored by the first user equipment, which is sent by the proximity service server through a mobility management entity; and the sending, by the first user equipment, broadcast information belonging to the broadcast information list and monitored and obtained by the first user equipment to the proximity service server may be: sending, by the first user equipment, the broadcast information belonging to the broadcast information list and monitored and obtained by the first user equipment to the proximity service server through the mobility management entity.

In still another implementation manner of this embodiment, step 401 may be: A first user equipment sends an equipment identifier to a proximity service server through a mobility management entity.

In the implementation manner, the equipment identifier may include an equipment identifier of the first user equipment; in this case, step 402 may be: The first user equipment receives a proximate equipment identifier list stored by the proximity service server and corresponding to the equipment identifier of the first user equipment, which is sent by the proximity service server through the mobility management entity.

In the implementation manner, the equipment identifier may include an equipment identifier of the first user equipment and an equipment identifier of a second user equipment; in this case, step 402 may be: The first user equipment receives information fed back through the mobility management entity by the proximity service server, where the information indicates that the second user equipment is a proximate equipment of the first user equipment or that the second user equipment is not a proximate equipment of the first user equipment.

In the above embodiment, after the first user equipment sends the equipment identifier to the proximity service server, the first user equipment receives the information of the proximate equipment which is sent by the proximity service server and corresponding to the equipment identifier, thereby implementing a proximity discovery service under network control.

Figure 5:
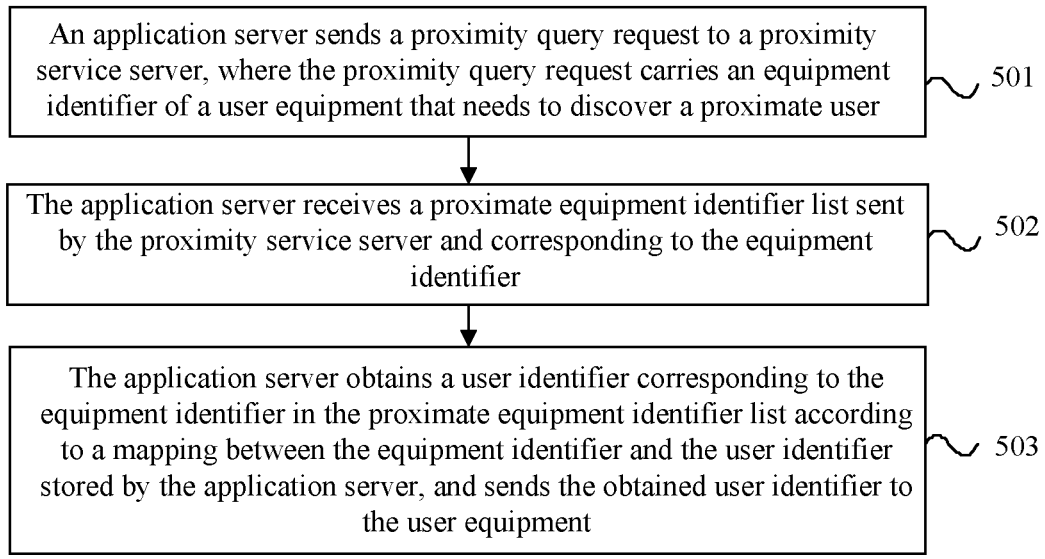
FIG. 5 is a flowchart of an embodiment of a proximate user discovery method according to the present invention.

FIG. 5 is a flowchart of an embodiment of a proximate user discovery method according to the present invention. As shown in FIG. 5, the proximate user discovery method may include:

Step 501: An application server sends a proximity query request to a proximity service server, where the proximity query request carries an equipment identifier of a user equipment that needs to discover a proximate user.

Step 502: The application server receives a proximate equipment identifier list sent by the proximity service server and corresponding to the equipment identifier.

Step 503: The application server obtains a user identifier corresponding to the equipment identifier in the proximate equipment identifier list according to a correspondence between the equipment identifier and the user identifier which is stored by the application server, and sends the obtained user identifier to the user equipment.

In an implementation manner of this embodiment, step 501 may be: After receiving a proximate user discovery request sent by a user equipment, an application server sends a proximity query request to a proximity service server, where the proximate user discovery request is a request for discovering a user using the same application as the user using the user equipment.

In the implementation manner, before step 501, the application server may further receive a user registration request sent by the user equipment, where the user registration request carries the equipment identifier of the user equipment and the user identifier of the user using the user equipment; then the application server stores the correspondence between the equipment identifier of the user equipment and the user identifier.

In another implementation manner of this embodiment, the proximity query request may further carry an equipment identifier of a proximate equipment to be monitored by the user equipment, where the equipment identifier of the proximate equipment to be monitored by the user equipment is determined by the application server according to application-layer information of the user equipment. Therefore, step 502 may be: The application server receives a proximate equipment identifier list corresponding to the equipment identifier and sent after the proximate equipment identifier list stored by the proximity service server and corresponding to the equipment identifier changes by the proximity service server.

Further, the proximity query request may further carry a feedback period that the application server subscribes to from the proximity service server; therefore, step 502 may be: The application server receives a proximate equipment identifier list of the user equipment, which is fed back by the proximity service server according to the feedback period.

In the implementation manner, the proximate equipment identifier list of the user equipment which is sent by the proximity service server is obtained by the proximity service server according to broadcast information monitored and obtained by the user equipment and the correspondence between the equipment identifier and the broadcast information which is stored by the proximity service server after the proximity service server configures, according to the equipment identifier of the proximate equipment to be monitored by the user equipment, a broadcast information list of an equipment set to be monitored by the user equipment, sends the broadcast information list of the equipment set to be monitored by the user equipment to the user equipment, and receives broadcast information belonging to the broadcast information list and monitored and obtained by the user equipment.

In still another implementation manner of this embodiment, the proximity query request may further carry an equipment identifier of another user equipment than the user equipment. Likewise, the equipment identifier of the another user equipment may be determined by the application server according to application-layer information of the user equipment. In the implementation manner, the application server may receive information fed back by the proximity service server, where the information indicates that the another user equipment is a proximate equipment of the user equipment or that the another user equipment is not a proximate equipment of the user equipment.

Specifically, the proximity service server may query, according to the equipment identifier of the user equipment and the equipment identifier of the another user equipment, a proximate equipment identifier list stored by the proximity service server and corresponding to the equipment identifier of the user equipment; if the proximity service server finds the equipment identifier of the another user equipment in the proximate equipment identifier list, the proximity service server feeds back that the another user equipment is a proximate equipment of the user equipment, that is, the user equipment and the another user equipment are in a proximity relationship, to the application server; if the proximity service server does not find the equipment identifier of the another user equipment in the proximate equipment identifier list, the proximity service server feeds back that the another user equipment is not a proximate equipment of the user equipment, that is, the user equipment and the another user equipment are not in a proximity relationship, to the application server.

In the above embodiment, after the application server sends the equipment identifier of the user equipment that needs to discover a proximate user to the proximity service server, the application server receives the proximate equipment identifier list of the user equipment which is sent by the proximity service server, then obtains the user identifier corresponding to the equipment identifier in the proximate equipment identifier list according to the correspondence between the equipment identifier and the user identifier which is stored by the application server, and then sends the obtained user identifier to the user equipment. Therefore, under network control, a user using the user equipment can discover a proximate user using the same application as the user.

Figure 6:
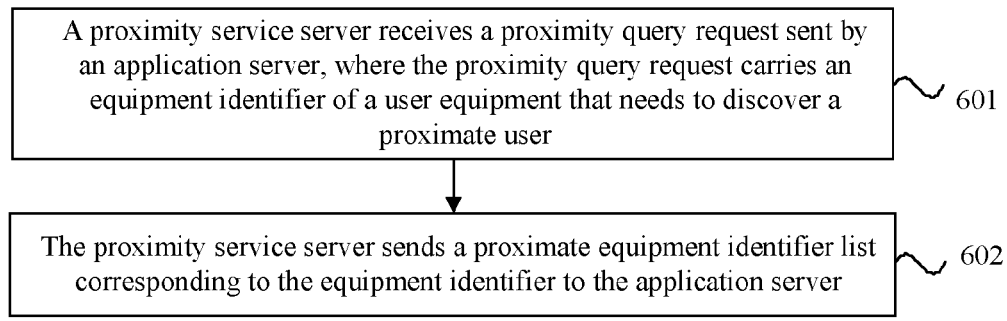
FIG. 6 is a flowchart of another embodiment of a proximate user discovery method according to the present invention.

FIG. 6 is a flowchart of another embodiment of a proximate user discovery method according to the present invention. As shown in FIG. 6, the proximate user discovery method may include:

Step 601: A proximity service server receives a proximity query request sent by an application server, where the proximity query request carries an equipment identifier of a user equipment that needs to discover a proximate user.

Specifically, the receiving, by a proximity service server, a proximity query request sent by an application server may be: receiving, by the proximity service server, the proximity query request sent by the application server after the application server receives a proximate user discovery request sent by a user equipment.

Step 602: The proximity service server sends a proximate equipment identifier list corresponding to the equipment identifier to the application server, so that the application server obtains a user identifier corresponding to the equipment identifier in the proximate equipment identifier list according to a correspondence between the equipment identifier and the user identifier which is stored by the application server and sends the obtained user identifier to the user equipment.

In this embodiment, the proximity query request may further carry an equipment identifier of a proximate equipment to be monitored by the user equipment, where the equipment identifier of the proximate equipment to be monitored by the user equipment is determined by the application server according to application-layer information of the user equipment.

Specifically, the sending, by the proximity service server, a proximate equipment identifier list corresponding to the equipment identifier to the application server may be: sending, by the proximity service server, the proximate equipment identifier list corresponding to the equipment identifier to the application server after the proximate equipment identifier list stored by the proximity service server and corresponding to the equipment identifier changes.

In this embodiment, before the proximity service server sends the proximate equipment identifier list corresponding to the equipment identifier to the application server, the proximity service server may further configure, according to the equipment identifier of the proximate equipment to be monitored by the user equipment, a broadcast information list of an equipment set to be monitored by the user equipment, and send the broadcast information list of the equipment set to be monitored by the user equipment to the user equipment; then the proximity service server receives broadcast information belonging to the broadcast information list and monitored and obtained by the user equipment, and obtains, according to the broadcast information monitored and obtained by the user equipment and the correspondence between the equipment identifier and the broadcast information which is stored by the proximity service server, the proximate equipment identifier list corresponding to the equipment identifier.

In the above embodiment, under network control, a user using the user equipment can discover a proximate user using the same application as the user.

The methods provided by the embodiments shown in FIG. 1 to FIG. 6 of the present invention may be applied to a communication system such as a system architecture evolution (System Architecture Evolution, hereinafter briefly referred to as SAE) communication system, a long term evolution (Long Term Evolution, hereinafter briefly referred to as LTE) communication system, a wideband code division multiple access (Wideband Code Division Multiple Access, hereinafter briefly referred to as WCDMA) communication system, a worldwide interoperability for microwave access (Worldwide Interoperability for Microwave Access) communication system, or a global system for mobile communication (Global System for Mobile communication, hereinafter briefly referred to as GSM).

The following embodiments of the present invention are described by using an LTE communication system as an example. Other communication systems, where similar network elements may be replaced, are not further described herein.

Figure 7:
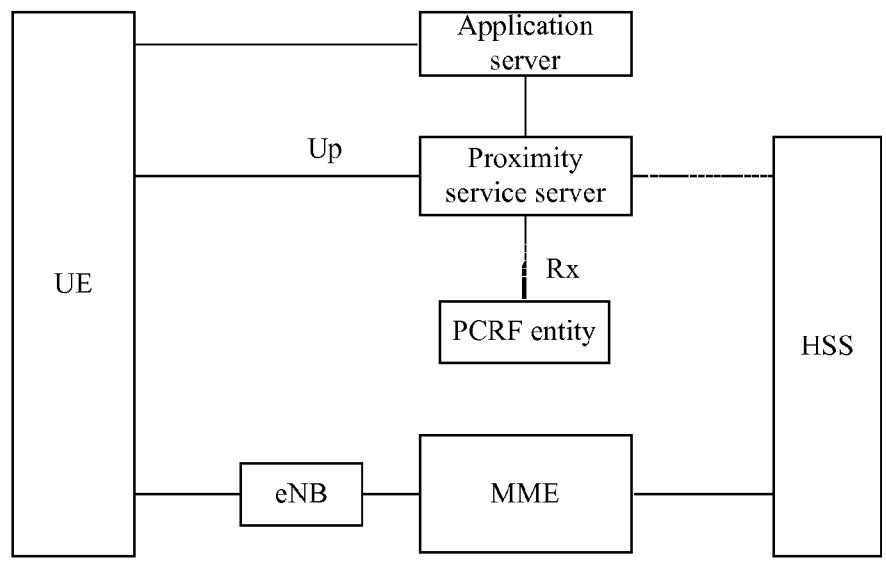
FIG. 7 is a schematic diagram of an embodiment of a network architecture according to the present invention.

The methods provided by the embodiments shown in FIG. 1 to FIG. 6 of the present invention may be applied to the network architecture shown in FIG. 7. FIG. 7 is a schematic diagram of an embodiment of a network architecture according to the present invention. In the architecture shown in FIG. 7, a direct interface exists between a UE and a proximity service server, for example, the UE and the proximity service server may directly perform a Session Initiation Protocol (Session Initiation Protocol, hereinafter briefly referred to as SIP) signaling interaction.

The following describes the specific implementation of the method provided by the present invention in the architecture shown in FIG. 7.

Figure 8:
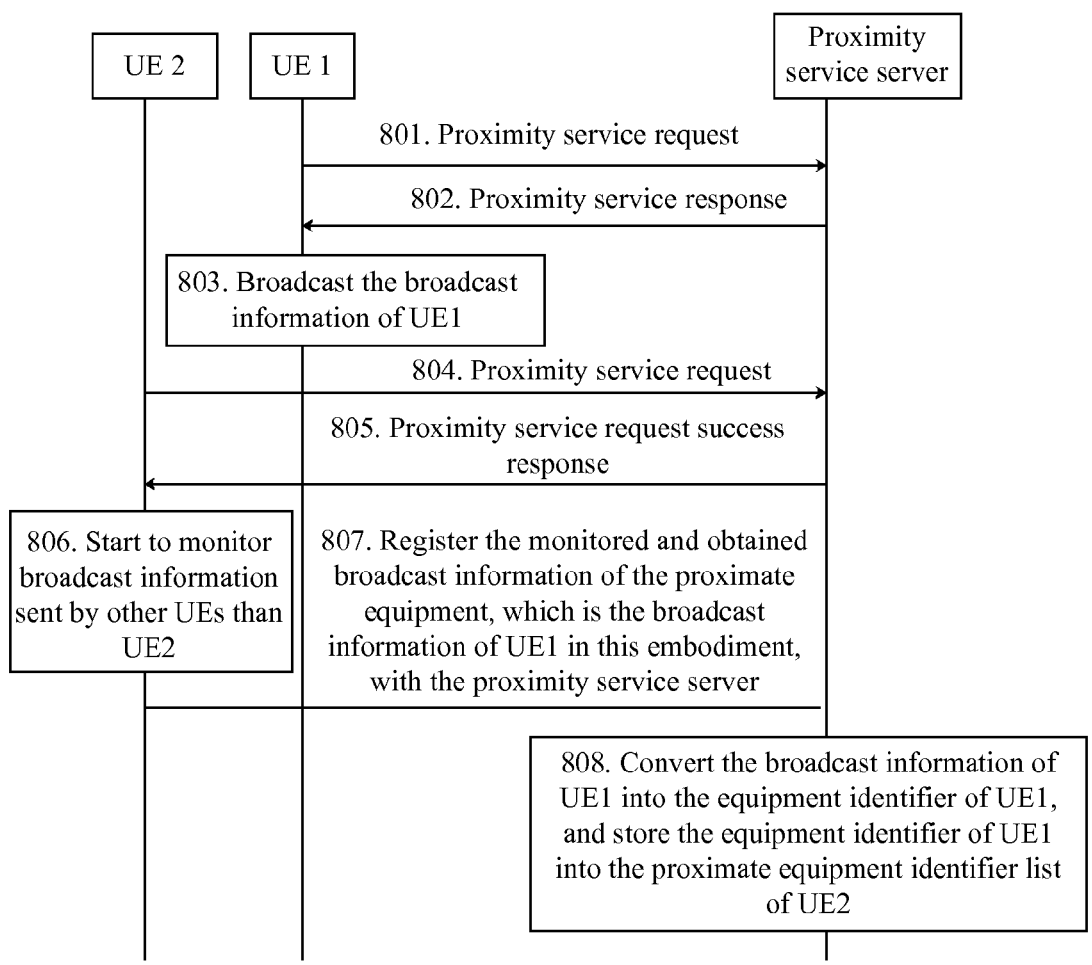
FIG. 8 is a flowchart of still another embodiment of a proximity information registration method according to the present invention.

FIG. 8 is a flowchart of still another embodiment of a proximity information registration method according to the present invention. As shown in FIG. 8, the proximity information registration method may include:

Step 801: UE 1 sends a proximity service request to a proximity service server. In this embodiment, the proximity service request carries an equipment identifier (device identifier, hereinafter briefly referred to as device id) of UE 1, where the equipment identifier of UE 1 may be an MSISDN, a SIP URI, or an IP address of UE 1, which is already defined in a network, or may also be a newly defined identifier. This embodiment does not limit the form of the equipment identifier of UE 1 as long as the identifier can uniquely identify UE 1.

Optionally, the proximity service request may further carry information indicating that UE 1 requests to be discovered by a proximate equipment.

In this embodiment, the proximity service request may be a newly defined message or an existing attach (Attach) message or a tracking area update (Tracking Area Update, hereinafter briefly referred to as TAU) message, and so on. This embodiment does not limit the message form used by the proximity service request.

Step 802: After receiving the proximity service request, the proximity service server allocates broadcast information to UE 1, and sends a proximity service response carrying the broadcast information allocated to UE 1 to UE 1, and the proximity service server stores a correspondence between the equipment identifier of UE 1 and the broadcast information.

Specifically, after receiving the proximity service request sent by UE 1, the proximity service server may determine, according to the equipment identifier of UE 1 which is carried in the proximity service request, that UE 1 has a capability of being discovered by a proximate equipment, and then the proximity service server allocates the broadcast information to UE 1 and returns the broadcast information to UE 1; or, after receiving the proximity service request sent by UE 1, the proximity service server determines, according to the equipment identifier of UE 1 which is carried in the proximity service request, that UE 1 has a capability of being discovered by a proximate equipment, and the proximity service server may query other network devices, for example, a home subscriber server (Home Subscriber Server, hereinafter briefly referred to as HSS), a policy and charging rules function (Policy and Charging Rules Function, hereinafter briefly referred to as PCRF), or a charging network element, to decide whether UE 1 is allowed to be discovered by a proximate equipment, and if yes, allocate the broadcast information to the UE 1 and return the broadcast information to UE 1.

In this embodiment, the broadcast information may be broadcast code (Broadcast Code), and definitely, is not limited by the present invention. The present invention does not limit the specific form of the broadcast information.

Optionally, the proximity service server may allocate the broadcast information to UE 1 when the received proximity service request carries the information indicating that UE 1 requests to be discovered by a proximate equipment; the proximity service server does not allocate the broadcast information to UE 1 when the received proximity service request does not carry the information indicating that UE 1 requests to be discovered by a proximate equipment.

Step 803: UE 1 broadcasts the broadcast information of UE 1.

Step 804: UE 2 sends a proximity service request to the proximity service server.

In this embodiment, the proximity service request carries an equipment identifier of UE 2; likewise, the equipment identifier of UE 2 may be an MSISDN, a SIP URI, or an IP address of UE 2, which is already defined in a network, or may also be a newly defined identifier. This embodiment does not limit the form of the equipment identifier of UE 2 as long as the identifier can uniquely identify UE 2.

Optionally, the proximity service request may further carry information indicating that UE 2 requests to discover a proximate equipment.

Step 805: The proximity service server records that UE 2 has a capability of discovering a proximate equipment, and sends a success response with respect to the proximity service request to UE 2.

Specifically, after the proximity service server receives the proximity service request sent by UE 2, the proximity service server may determine, according to the equipment identifier of UE 2 which is carried in the proximity service request, that UE 2 has a capability of discovering a proximate equipment, and then the proximity service server records that UE 2 has a capability of discovering a proximate equipment, and sends a success response with respect to the proximity service request to UE 2; or, after the proximity service server receives the proximity service request sent by UE 2, the proximity service server may determine, according to the equipment identifier of UE 2 which is carried in the proximity service request, that UE 2 has a capability of discovering a proximate equipment, and then the proximity service server may query other network devices, for example, an HSS, a PCRF, or a charging network element, to decide whether UE 2 is allowed to discover a proximate equipment, and if yes, the proximity service server records that UE 2 has a capability of discovering a proximate equipment, and sends a success response with respect to the proximity service request to UE 2.

Step 806: After UE 2 receives the proximity service request success response, UE 2 starts to monitor broadcast information sent by other UEs than UE 2.

Specifically, when UE 2 monitors and obtains broadcast information of a UE, for example, UE 1, UE 2 may determine that UE 1 is a proximate equipment of UE 2, which indicates that UE 1 appears in a proximity range of UE 2; or after UE 2 monitors and obtains broadcast information of a UE, for example, UE 1, and attempts to perform a physical-layer interaction successfully, UE 2 may determine that UE 1 is a proximate equipment of UE 2, which indicates that UE 1 appears in a proximity range of UE 2.

Step 807: UE 2 registers the monitored and obtained broadcast information of the proximate equipment, which is the broadcast information of UE 1 in this embodiment, with the proximity service server.

Step 808: The proximity service server converts, according to the correspondence between the equipment identifier of UE 1 and the broadcast information which is stored in step 802, the broadcast information of UE 1 into the equipment identifier of UE 1, and stores the equipment identifier of UE 1 into the proximate equipment identifier list of UE 2.

This embodiment is described by using an example in which UE 1 requests to be discovered by a proximate equipment and UE 2 requests to discover a proximate equipment for description, but the present invention is not limited thereto. The UE (for example, UE 1 and/or UE 2) may simultaneously request to discover a proximate equipment and request to be discovered by a proximate equipment.

In the above embodiment, after UE 2 monitors and obtains the broadcast information of UE 1 broadcast by UE 1, UE 2 determines that UE 1 is a proximate equipment of UE 2, thereby improving accuracy of proximity discovery and improving user experience; furthermore, UE 2 registers the broadcast information of UE 1 with the proximity service server, and the proximity service server maintains the proximate equipment identifier list of UE 2, thereby implementing a proximity discovery service under network control; in addition, in this embodiment, the proximity service server allocates broadcast information used for proximate equipment discovery to UE 1, so that a network can manage and control the proximity discovery service.

Figure 9:
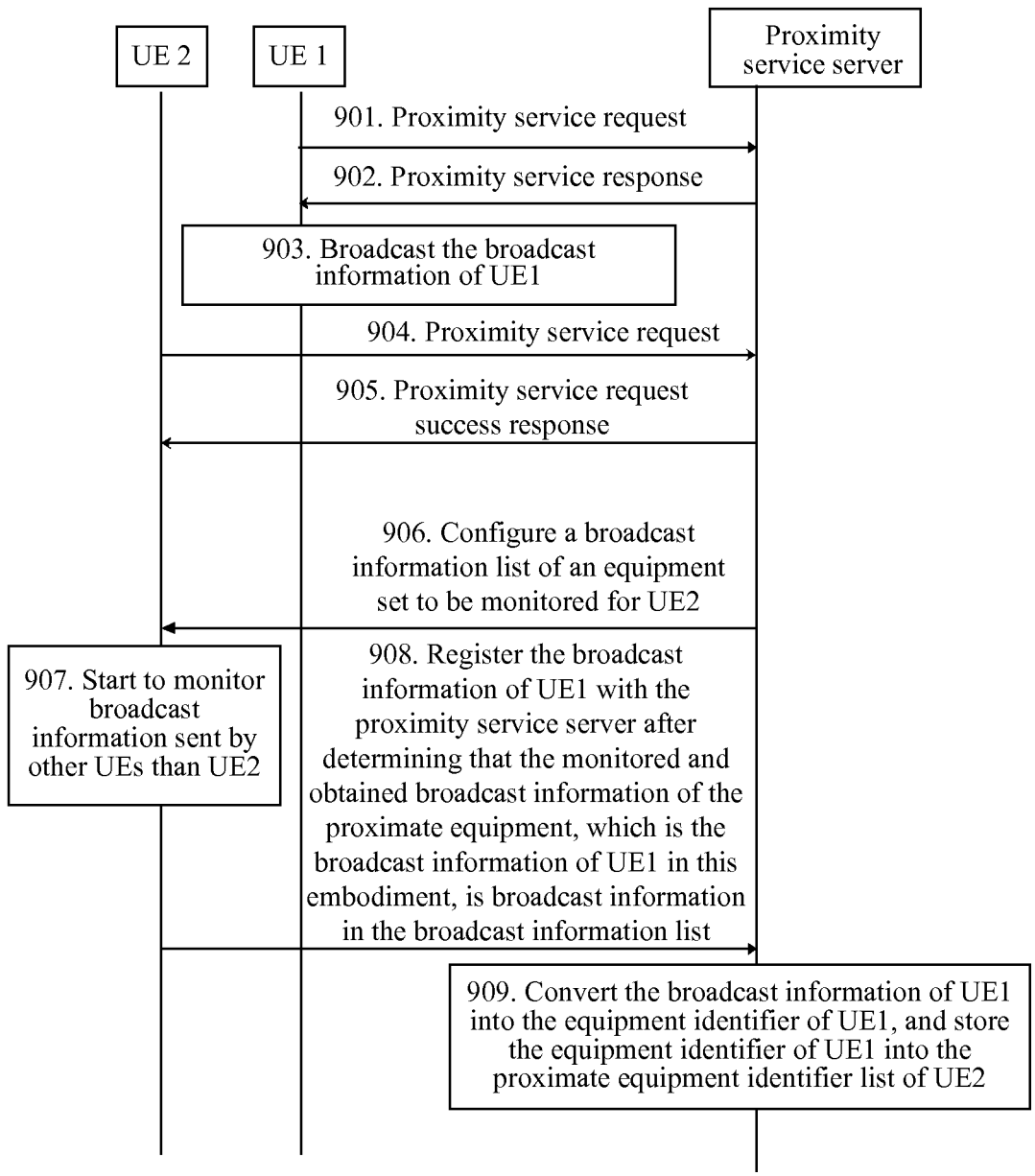
FIG. 9 is a flowchart of still another embodiment of a proximity information registration method according to the present invention.

FIG. 9 is a flowchart of still another embodiment of a proximity information registration method according to the present invention. As shown in FIG. 9, the proximity information registration method may include:

Step 901 to step 905: Same as step 801 to step 805.

Step 906: The proximity service server configures, according to its configuration or a trigger of an application server, a broadcast information list of an equipment set to be monitored for UE 2.

In this embodiment, step 906 and step 905 may occur simultaneously, and in this case, the configured broadcast information list may be added to the success response with respect to the proximity service request sent in step 905; or, step 906 may also occur at any time after step 905, and in this case, the broadcast information list may be delivered by using a message different from that in step 905.

Step 907: UE 2 starts to monitor broadcast information sent by other UEs than UE 2.

Specifically, when UE 2 monitors and obtains broadcast information of a UE, for example, UE 1, UE 2 may determine that UE 1 is a proximate equipment of UE 2, which indicates that UE 1 appears in a proximity range of UE 2; or after UE 2 monitors and obtains broadcast information of a UE, for example, UE 1, and attempts to perform a physical-layer interaction successfully, UE 2 may determine that UE 1 is a proximate equipment of UE 2, which indicates that UE 1 appears in a proximity range of UE 2.

Step 908: After UE 2 determines that the monitored and obtained broadcast information of the proximate equipment, which is the broadcast information of UE 1 in this embodiment, is broadcast information in the broadcast information list, UE 2 registers the broadcast information of UE 1 with the proximity service server.

In this embodiment, UE 2 registers the broadcast information with the proximity service server only after monitoring and obtaining the broadcast information belonging to the configured broadcast information list.

Step 909: The proximity service server converts, according to the correspondence between the equipment identifier of UE 1 and the broadcast information which is stored in step 902, the broadcast information of UE 1 into the equipment identifier of UE 1, and stores the equipment identifier of UE 1 into the proximate equipment identifier list of UE 2.

This embodiment is described by using an example in which UE 1 requests to be discovered by a proximate equipment and UE 2 requests to discover a proximate equipment for description, but the present invention is not limited thereto. The UE (for example, UE 1 and/or UE 2) may simultaneously request to discover a proximate equipment and request to be discovered by a proximate equipment.

In this embodiment, UE 2 reports proximate equipment information to the proximity service server only after monitoring and obtaining the broadcast information belonging to the broadcast information list of the equipment set to be monitored by UE 2. This can reduce the interactions between UE 2 and a network greatly, and reduce the network signaling load.

Figure 10:
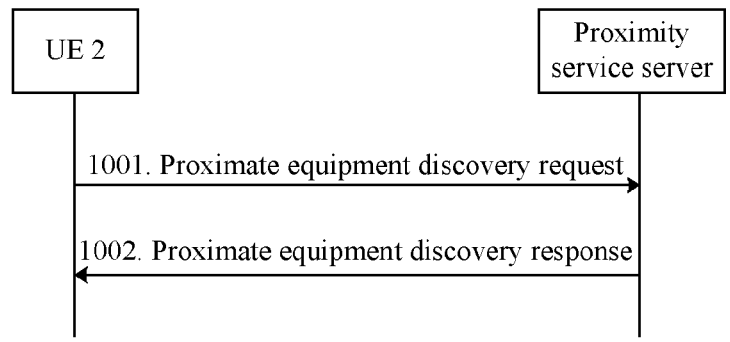
FIG. 10 is a flowchart of still another embodiment of a proximity information query method according to the present invention.

FIG. 10 is a flowchart of still another embodiment of a proximity information query method according to the present invention. As shown in FIG. 10, the proximity information query method may include:

Step 1001: A proximity service server receives a proximate equipment discovery request sent by UE 2.

Step 1002: The proximity service server sends a proximate equipment discovery response to UE 2.

Alternatively, step 1001 may be: A proximity service server receives a proximate equipment discovery request sent by an application server; in this case, step 1002 may be: The proximity service server sends a proximate equipment discovery response to the application server.

In this embodiment, before step 1001, the proximity service server has maintained a proximate equipment identifier list of UE 2; specifically, the proximity service server may obtain and maintain the proximate equipment identifier list of UE 2 according to the method provided by the embodiment shown in FIG. 1, FIG. 2, FIG. 8, or FIG. 9 of the present invention.

In an implementation manner of this embodiment, the proximate equipment discovery request in step 1001 carries an equipment identifier of UE 2; in the implementation manner, the proximate equipment discovery response in step 1002 carries a proximate equipment identifier list stored by the proximity service server and corresponding to the equipment identifier of UE 2, that is, the proximate equipment identifier list of UE 2.

In another implementation manner of this embodiment, the proximate equipment discovery request in step 1001 carries an equipment identifier of UE 2 and an equipment identifier of UE 1; in the implementation manner, the proximate equipment discovery response sent by the proximity service server in step 1002 carries a proximity relationship query result, for example, UE 1 and UE 2 are in a proximity relationship, or UE and UE 2 are not in a proximity relationship. Specifically, the proximity service server queries, according to the equipment identifier of UE 2 and the equipment identifier of UE 1, the proximate equipment identifier list stored by the proximity service server and corresponding to the equipment identifier of UE 2; if the proximity service server finds the equipment identifier of UE 1 in the proximate equipment identifier list, the proximity service server feeds back that UE 1 is a proximate equipment of UE 2, that is, UE 1 and UE 2 are in a proximity relationship, to the application server or UE 2; if the proximity service server does not find the equipment identifier of UE 1 in the proximate equipment identifier list, the proximity service server feeds back that UE 1 is not a proximate equipment of UE 2, that is, UE 1 and UE 2 are not in a proximity relationship, to the application server or UE 2.

In the above embodiment, after receiving the proximate equipment discovery request, the proximity service server sends the proximate equipment discovery response to the application server or UE 2 according to information carried in the proximate equipment discovery request, thereby implementing a proximity discovery service under network control.

Figure 11:
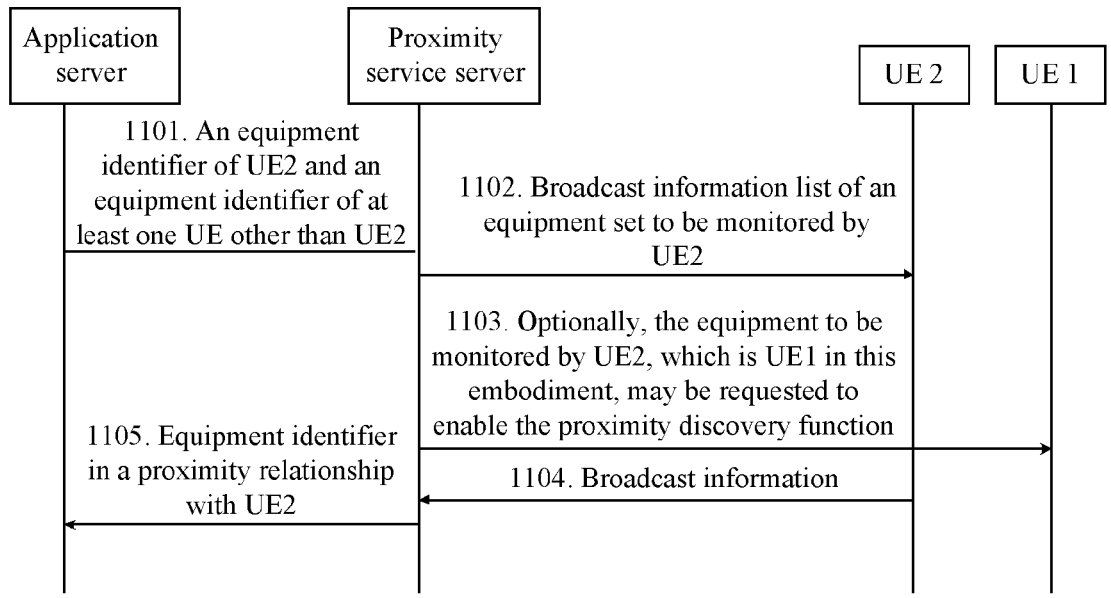
FIG. 11 is a flowchart of still another embodiment of a proximity information query method according to the present invention.

FIG. 11 is a flowchart of still another embodiment of a proximity information query method according to the present invention. As shown in FIG. 11, the proximity information query method may include:

Step 1101: An application server sends an equipment identifier of UE 2 and an equipment identifier of at least one UE other than UE 2 to a proximity service server, indicating that it is necessary to query a proximity relationship between UE 2 and the at least one UE.

Step 1102: The proximity service server obtains, according to a correspondence between the equipment identifier and broadcast information which is stored by the proximity service server, broadcast information of the at least one UE corresponding to the equipment identifier of the at least one UE, stores the broadcast information of the at least one UE into a broadcast information list of an equipment set to be monitored by UE 2, and sends the broadcast information list of the equipment set to be monitored by UE 2 to UE 2.

Step 1103: Optionally, the proximity service server may request the equipment to be monitored by UE 2, which is UE 1 in this embodiment, to enable a proximity discovery function.

Step 1104: UE 2 monitors and obtains broadcast information belonging to the broadcast information list, and sends the broadcast information to the proximity service server.

Step 1105: The proximity service server feeds back an equipment identifier in a proximity relationship with UE 2 to the application server.

The equipment identifier in a proximity relationship with UE 2 is obtained by the proximity service server according to the broadcast information sent by UE 2 in step 1104 and the correspondence between the equipment identifier and the broadcast information which is stored by the proximity service server.

In the above embodiment, after the proximity service server receives the equipment identifier sent by the application server, the proximity service server configures the broadcast information list of the equipment set to be monitored for UE 2; after UE 2 sends the monitored and obtained the broadcast information belonging to the broadcast information list to the proximity service server, the proximity service server feeds back the equipment identifier in a proximity relationship with UE 2 to the application server, thereby implementing a proximity discovery service under network control and supporting an operator in reasonably controlling a provided service and benefiting from the service.

Figure 12:
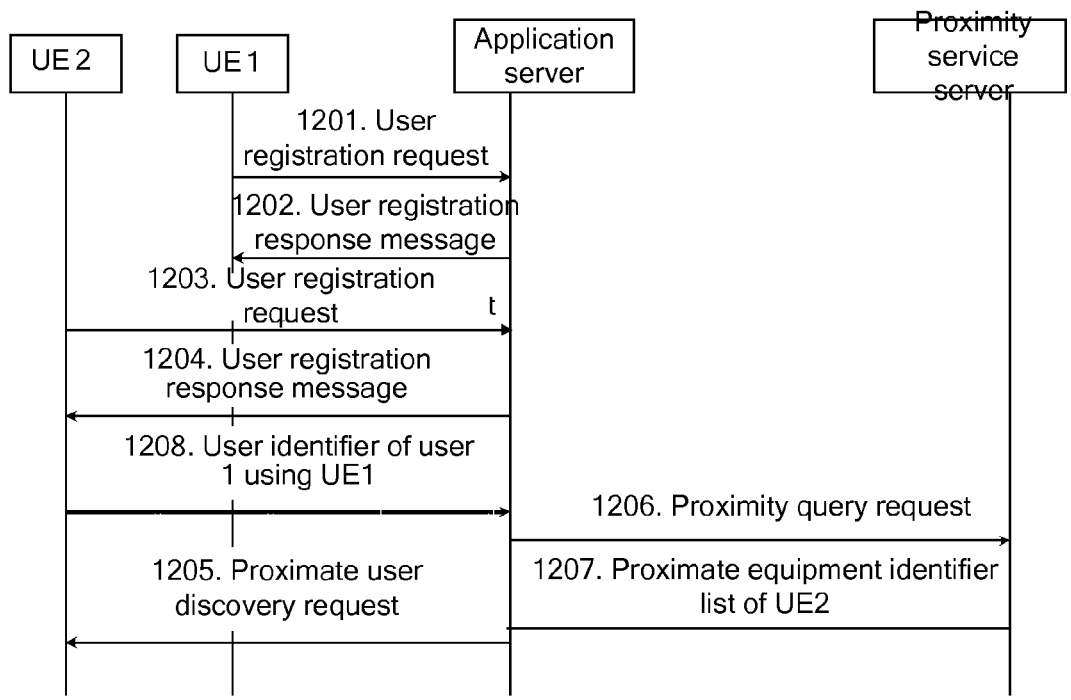
FIG. 12 is a flowchart of still another embodiment of a proximate user discovery method according to the present invention.

FIG. 12 is a flowchart of still another embodiment of a proximate user discovery method according to the present invention. As shown in FIG. 12, the proximate user discovery method may include:

Step 1201: UE 1 sends a user registration request to an application server, where the user registration request carries an equipment identifier of UE 1 and a user identifier of user 1 using UE 1.

The equipment identifier of UE 1 may be an MSISDN, a SIP URI, or an IP address of UE 1, which is already defined in a network, or may also be a newly defined identifier. This embodiment does not limit the form of the equipment identifier of UE 1 as long as the identifier can uniquely identify UE 1.

The user identifier may be a SIP URI of an IP multimedia subsystem (IP Multimedia Subsystem, hereinafter briefly referred to as IMS) service, an MSN ID of a Microsoft service network (Microsoft Service Network, hereinafter briefly referred to as MSN) application, a QQ number of a QQ application, and so on, and may vary according to specific applications. This embodiment does not limit the specific form of the user.

Step 1202: The application server stores the equipment identifier of UE 1 and the corresponding user identifier, and returns a user registration response message.

Step 1203: UE 2 sends a user registration request to the application server, where the user registration request carries an equipment identifier of UE 2 and a user identifier of user 2 using UE 2.

The equipment identifier of UE 2 may be an MSISDN, a SIP URI, or an IP address of UE 2, which is already defined in a network, or may also be a newly defined identifier. This embodiment does not limit the form of the equipment identifier of UE 2 as long as the identifier can uniquely identify UE 2.

The user identifier may be a SIP URI of the IMS service, an MSN ID of the MSN application, a QQ number of the QQ application, and so on, and may vary according to specific applications. This embodiment does not limit the specific form of the user.

Step 1204: The application server stores the equipment identifier of UE 2 and the corresponding user identifier, and returns a user registration response message.

In this embodiment, step 1201 to step 1202 and step 1203 to step 1204 may be executed sequentially or simultaneously. This embodiment does not limit the sequence of executing step 1201 to step 1202 and step 1203 to step 1204, that is, UE 1 and UE 2 may be registered simultaneously or sequentially.

Step 1205: UE 2 sends a proximate user discovery request to the application server, where the proximate user discovery request is a request for discovering a user using the same application as user 2 using UE 2.

Step 1206: According to the request of UE 2 or according to a trigger of the application server itself, for example, a timer, the application server sends a proximity query request to the proximity service server, where the proximity query request carries the equipment identifier of UE 2.

Step 1207: The proximity service server feeds back a proximate equipment identifier list of UE 2 to the application server.

In this embodiment, the proximate equipment identifier list of UE 2 includes the equipment identifier of UE 1.

Specifically, in this step, the proximity service server may determine, according to the equipment identifier of UE 2, whether UE 2 has a capability of discovering a proximate equipment; if the proximity service server determines that UE 2 has a capability of discovering a proximate equipment, the proximity service server feeds back the proximate equipment identifier list of UE 2 to the application server. Alternatively, the proximity service server may determine, according to the equipment identifier of UE 2, that UE 2 has a capability of discovering a proximate equipment, and the proximity service server may query other network devices, for example, an HSS, a PCRF, or a charging network element, to decide whether UE 2 is allowed to discover a proximate equipment, and if yes, the proximity service server feeds back the proximate equipment identifier list of UE 2 to the application server.

Step 1208: The application server obtains, according to a correspondence between the equipment identifier and the user identifier which is stored by the application server, the user identifier corresponding to the equipment identifier in the proximate equipment identifier list of UE 2, which is the user identifier corresponding to the equipment identifier of UE 1 in this embodiment, that is, the user identifier of user 1 using UE 1, and then returns the user identifier of user 1 using UE 1 to UE 2.

Therefore, user 2 using UE 2 may discover that user 1 using UE 1 is a proximate user using the same application as user 2.

In the above embodiment, after the application server sends the equipment identifier of UE 2 to the proximity service server, the application server receives the proximate equipment identifier list of UE 2 which is sent by the proximity service server, then obtains the user identifier corresponding to the equipment identifier in the proximate equipment identifier list according to the correspondence between the equipment identifier and the user identifier which is stored by the application server, and then sends the obtained user identifier to UE 2. Therefore, under network control, the user using UE 2 can discover a proximate user using the same application as the user.

Figure 13:
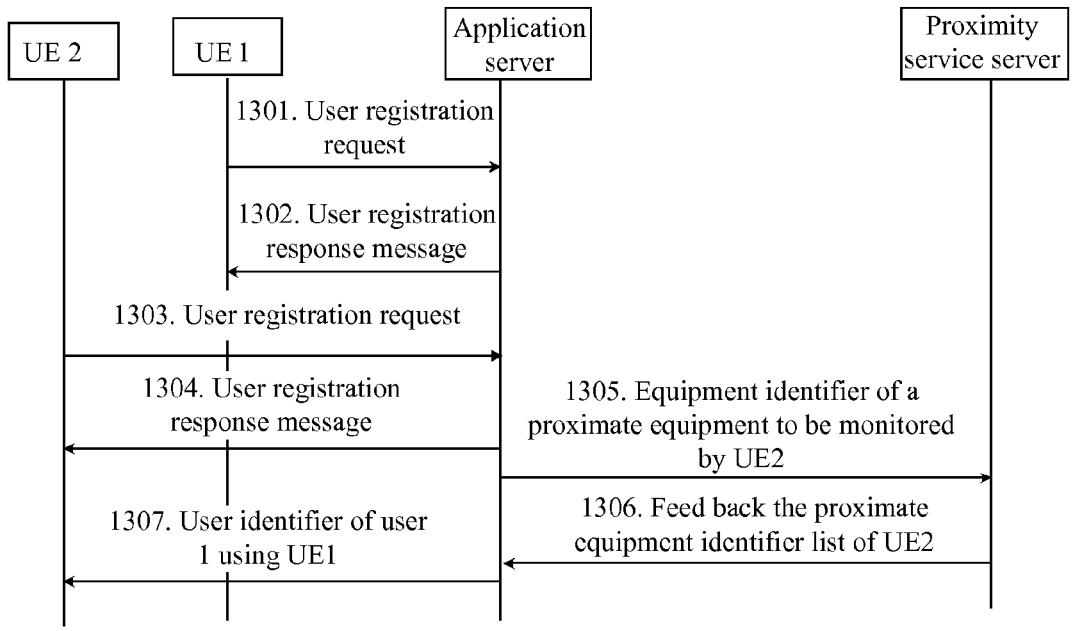
FIG. 13 is a flowchart of still another embodiment of a proximate user discovery method according to the present invention.

FIG. 13 is a flowchart of still another embodiment of a proximate user discovery method according to the present invention. As shown in FIG. 13, the proximate user discovery method may include:

Step 1301 to step 1304: Same as step 1201 to step 1204.

Step 1305: The application server determines, according to application-layer information of UE 2, for example, a friend list of a user using UE 2, an equipment identifier of a proximate equipment to be monitored by UE 2, and sends the equipment identifier of the proximate equipment to be monitored by UE 2 to the proximity service server. The proximity service server may configure, according to the received equipment identifier of the proximate equipment to be monitored by UE 2, a broadcast information list of an equipment set to be monitored by UE 2 for UE 2.

In this step, the application server may further subscribe to a feedback period of proximate equipment information from the proximity service server. The proximity service server may determine, according to the equipment identifier of UE 2, whether UE 2 has a capability of discovering a proximate equipment; if the proximity service server determines that UE 2 has a capability of discovering a proximate equipment, the proximity service server accepts the subscription request. Alternatively, the proximity service server may determine, according to the equipment identifier of UE 2, that UE 2 has a capability of discovering a proximate equipment, and the proximity service server may query other network devices, for example, an HSS, a PCRF, or a charging network element, to decide whether UE 2 is allowed to discover a proximate equipment, and if yes, the proximity service server accepts the subscription request.

Step 1306: When a proximate equipment identifier list of UE 2 which is maintained by the proximity service server changes, and/or meets the feedback period received in step 1305, the proximity service server feeds back the proximate equipment identifier list of UE 2 to the application server.

Optionally, before feedback each time, the proximity service server may confirm current charging with the PCRF or charging network element again, so as to decide whether UE 2 is allowed to discover a proximate equipment, and if yes, feed back the proximate equipment identifier list of UE 2.

In this embodiment, the proximate equipment identifier list of UE 2 which is fed back by the proximity service server to the application server may be obtained with reference to the method provided by the embodiment shown in FIG. 1, FIG. 2, FIG. 8, or FIG. 9 of the present invention. Specifically, the proximity service server may configure, according to the equipment identifier of the proximate equipment to be monitored by UE 2, which is sent by the application server in step 1305, the broadcast information list of the equipment set to be monitored by UE 2, and after sending the broadcast information list of the equipment set to be monitored by UE 2 to UE 2, receive the broadcast information belonging to the broadcast information list and monitored and obtained by UE 2, and then obtain the proximate equipment identifier list of UE 2 according to the broadcast information monitored and obtained by UE 2 and the correspondence between the equipment identifier and the broadcast information which is stored by the proximity service server.

Step 1307: Same as step 1208.

In the above embodiment, when the proximate equipment identifier list of UE 2 which is maintained by the proximity service server changes, and/or meets the feedback period subscribed to by the application server, the proximity service server feeds back the proximate equipment identifier list of UE 2 to the application server. Therefore, the interactions between the application server and the proximity service server are reduced greatly, and the network signaling load is reduced; in addition, under network control, a user using the user equipment can discover a proximate user using the same application as the user.

Figure 14:
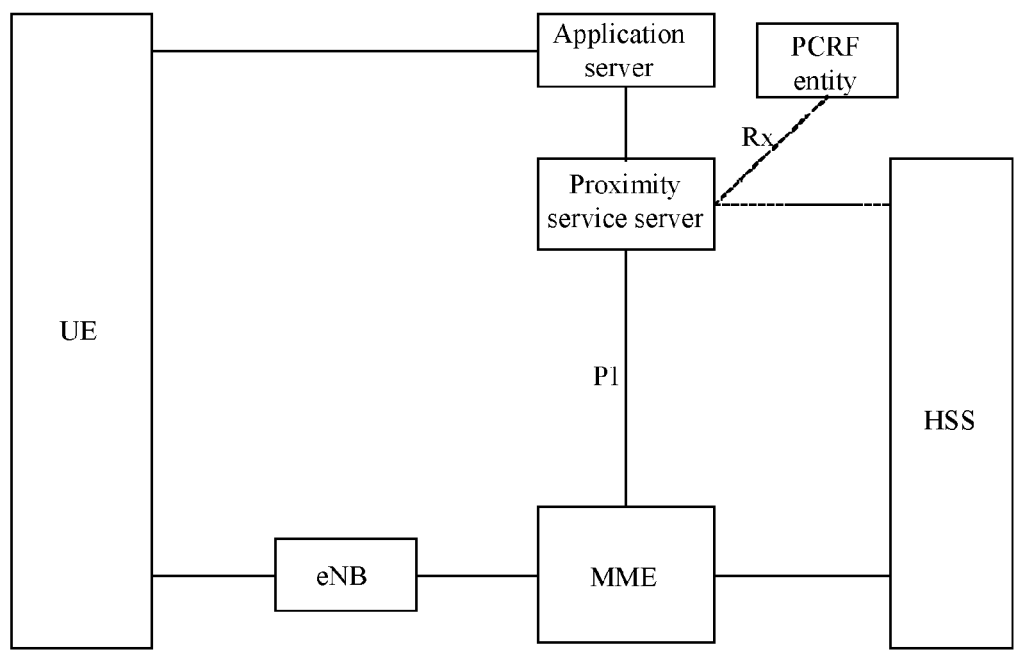
FIG. 14 is a schematic diagram of another embodiment of a network architecture according to the present invention.

The methods provided by the embodiments shown in FIG. 1 to FIG. 6 of the present invention may also be applied to a network architecture shown in FIG. 14. FIG. 14 is a schematic diagram of another embodiment of a network architecture according to the present invention. In the architecture shown in FIG. 14, a UE interacts with a proximity service server through an MME.

The following describes the specific implementation of the method provided by the present invention in the architecture shown in FIG. 14.

Figure 15:
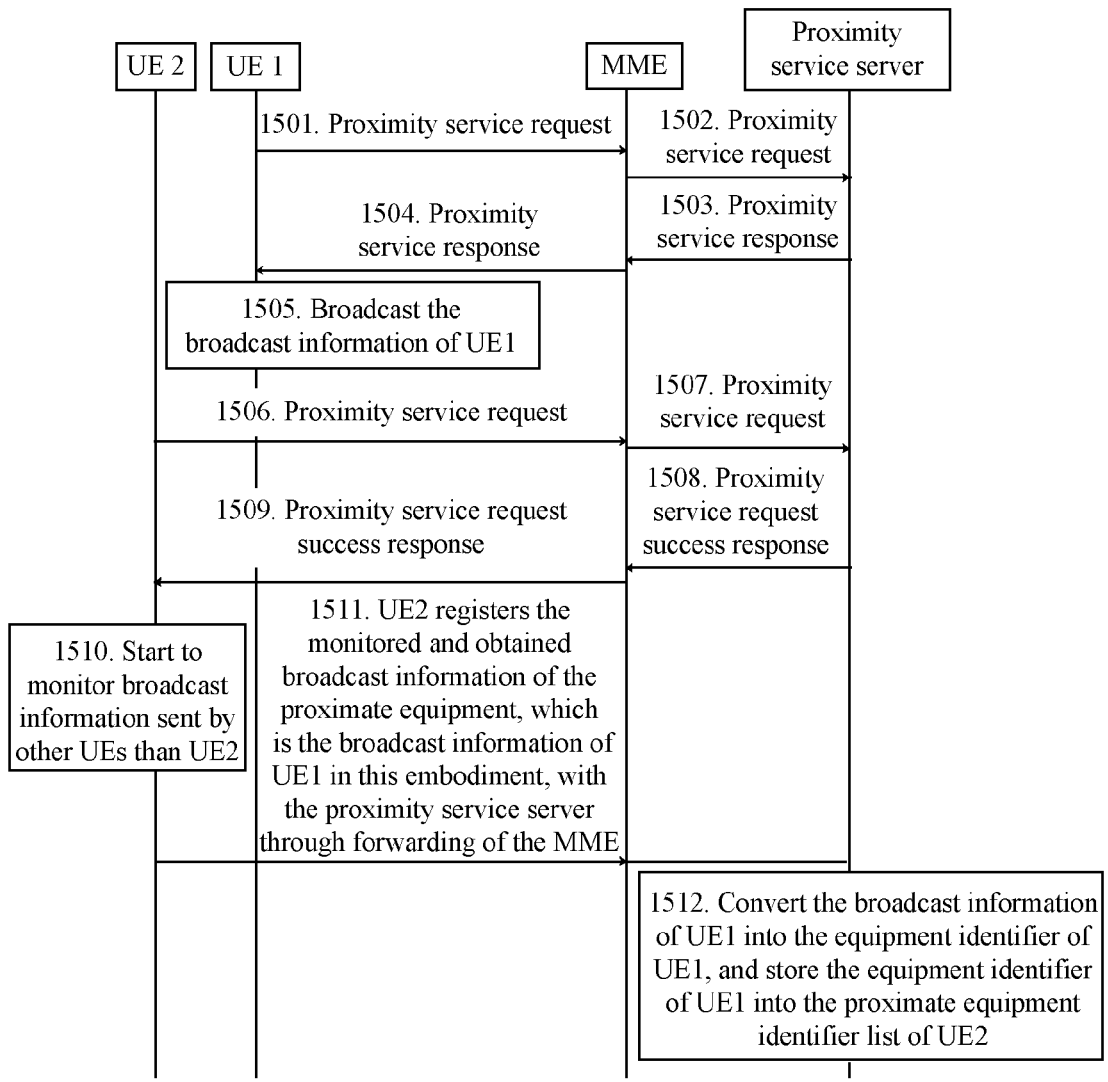
FIG. 15 is a flowchart of still another embodiment of a proximity information registration method according to the present invention.

FIG. 15 is a flowchart of still another embodiment of a proximity information registration method according to the present invention. As shown in FIG. 15, the proximity information registration method may include:

Step 1501: UE 1 sends a proximity service request to an MME.

In this embodiment, the proximity service request carries an equipment identifier of UE 1, where the equipment identifier of UE 1 may be an MSISDN, a SIP URI, or an IP address of UE 1, which is already defined in a network, or a temporary identifier allocated by the network, for example, a packet temporary mobile subscriber identity (Packet Temporary Mobile Subscriber Identity, hereinafter briefly referred to as P-TMSI) or a serving temporary mobile subscriber identity (Serving Temporary Mobile Subscriber Identity, hereinafter briefly referred to as S-TMSI), or may also be a newly defined identifier. This embodiment does not limit the form of the equipment identifier of UE 1 as long as the identifier can uniquely identify UE 1.

Optionally, the proximity service request sent by UE 1 may further carry information indicating that UE 1 requests to be discovered by a proximate equipment.

In this embodiment, the proximity service request may be a newly defined message or an existing Attach message or a TAU message, and so on. This embodiment does not limit the message form used by the proximity service request.

Step 1502: After receiving the proximity service request sent by UE 1, if the equipment identifier of UE 1 which is carried in the proximity service request sent by UE 1 is a temporary identifier of UE 1, the MME converts the temporary identifier of UE 1 into a fixed identifier of UE 1, for example, converts a P-TMSI into a fixed identifier such as an MSISDN or an IP address. Then the MME sends the proximity service request to the proximity service server, where the proximity service request sent by the MME carries the fixed identifier of UE 1, which is used to request the proximity service server to allocate broadcast information to UE 1.

In an implementation manner of this embodiment, the MME may first query subscription data from an HSS, determine whether UE 1 is allowed to be discovered by other equipments, and if yes, send a proximity service request to the proximity service server.

In another implementation manner of this embodiment, if in step 1501, the proximity service request sent by UE 1 carries information indicating that UE 1 requests to be discovered by a proximate equipment, the MME may send the proximity service request to the proximity service server when the proximity service request sent by UE 1 carries the information indicating that UE 1 requests to be discovered by a proximate equipment; when the proximity service request sent by UE 1 does not carry the information indicating that UE 1 requests to be discovered by a proximate equipment, the MME does not send the proximity service request to the proximity service server.

The two implementation manners may be used together, for example, if in step 1501, the proximity service request sent by UE 1 carries information indicating that UE 1 requests to be discovered by a proximate equipment, the MME may first query subscription data from the HSS when the proximity service request sent by UE 1 carries the information indicating that UE 1 requests to be discovered by a proximate equipment, determine whether UE 1 is allowed to be discovered by other equipments, and if yes, send the proximity service request to the proximity service server; when the proximity service request sent by UE 1 does not carry the information indicating that UE 1 requests to be discovered by a proximate equipment, the MME neither queries subscription data from the HSS nor sends the proximity service request to the proximity service server. Alternatively, the two implementation manners may also be used separately.

Definitely, the MME may also not use the two implementation manners. After receiving the proximity service request sent by UE 1, if the equipment identifier of UE 1 which is carried in the proximity service request sent by UE 1 is the temporary identifier of UE 1, the MME converts the temporary identifier of UE 1 into the fixed identifier of UE 1. Then the MME sends the proximity service request to the proximity service server, where the proximity service request sent by the MME carries the fixed identifier of UE 1.

Step 1503: After receiving the proximity service request sent by the MME, the proximity service server allocates broadcast information to UE 1, and sends a proximity service response carrying the broadcast information allocated to UE 1 to the MME, and the proximity service server stores a correspondence between the equipment identifier of UE 1 and the broadcast information.

Specifically, after receiving the proximity service request sent by the MME, the proximity service server may determine, according to the equipment identifier of UE 1 which is carried in the proximity service request, that UE 1 has a capability of being discovered by a proximate equipment, and then the proximity service server allocates the broadcast information to UE 1 and returns the broadcast information to UE 1; or after receiving the proximity service request sent by the MME, the proximity service server may determine, according to the equipment identifier of UE 1 which is carried in the proximity service request, that UE 1 has a capability of being discovered by a proximate equipment, and then the proximity service server may query other network devices, for example, an HSS, a PCRF, or a charging network element, to decide whether UE 1 is allowed to be discovered by a proximate equipment, and if yes, the proximity service server allocates the broadcast information to UE 1 and returns the broadcast information to UE 1; if in step 1502, the MME has queried subscription data from the HSS and authenticated a subscription capability of UE 1, the proximity service server in step 1503 only needs to query the PCRF or charging network element to decide whether UE 1 is allowed to be discovered by a proximate equipment, and if yes, allocates the broadcast information to UE 1 and returns the broadcast information to UE 1.

In this embodiment, the broadcast information may be broadcast code (Broadcast Code), and definitely, is not limited by the present invention. The present invention does not limit the specific form of the broadcast information.

Step 1504: The MME sends a proximity service response to UE 1, where the proximity service response sent by the MME carries the broadcast information of UE 1.

Step 1505: UE 1 broadcasts the broadcast information of UE 1.

Step 1506: UE 2 sends a proximity service request to the MME.

In this embodiment, the proximity service request carries an equipment identifier of UE 2, where the equipment identifier of UE 2 may be an MSISDN, a SIP URI, or an IP address of UE 2, which is already defined in the network, or a temporary identifier allocated by the network, for example, a P-TMSI, or an S-TMSI, and so on, or may also be a newly defined identifier. This embodiment does not limit the form of the equipment identifier of UE 2 as long as the identifier can uniquely identify UE 2.

Optionally, the proximity service request sent by UE 2 may further carry information indicating that UE 2 requests to discover a proximate equipment.

In this embodiment, the proximity service request may be a newly defined message or an existing Attach message or a TAU message, and so on. This embodiment does not limit the message form used by the proximity service request.

Step 1507: After receiving the proximity service request sent by UE 2, if the equipment identifier of UE 2 which is carried in the proximity service request sent by UE 2 is a temporary identifier of UE 2, the MME converts the temporary identifier of UE 2 into a fixed identifier of UE 2, for example, converts a P-TMSI into a fixed identifier such as an MSISDN or an IP address. Then the MME sends the proximity service request to the proximity service server, where the proximity service request sent by the MME carries the fixed identifier of UE 2.

In an implementation manner of this embodiment, the MME may first query subscription data from an HSS, determine whether UE 2 is allowed to discover a proximate equipment, and if yes, send a proximity service request to the proximity service server.

In another implementation manner of this embodiment, if in step 1506, the proximity service request sent by UE 2 carries information indicating that UE 2 requests to discover a proximate equipment, the MME may send the proximity service request to the proximity service server when the proximity service request sent by UE 2 carries the information indicating that UE 2 requests to discover a proximate equipment; when the proximity service request sent by UE 2 does not carry information indicating that UE 2 requests to discover a proximate equipment, the MME does not send the proximity service request to the proximity service server.

The two implementation manners may be used together, for example, if in step 1506, the proximity service request sent by UE 2 carries the information indicating that UE 2 requests to discover a proximate equipment, the MME may first query subscription data from the HSS when the proximity service request sent by UE 2 carries the information indicating that UE 2 requests to be discover a proximate equipment, determine whether UE 2 is allowed to discover a proximate equipment, and if yes, send the proximity service request to the proximity service server; when the proximity service request sent by UE 2 does not carry the information indicating that UE 2 requests to discover a proximate equipment, the MME neither queries subscription data from the HSS nor sends the proximity service request to the proximity service server. Alternatively, the two implementation manners may also be used separately.

Definitely, the MME may also not use the two implementation manners. After receiving the proximity service request sent by UE 2, if the equipment identifier of UE 2 which is carried in the proximity service request sent by UE 2 is the temporary identifier of UE 2, the MME converts the temporary identifier of UE 2 into the fixed identifier of UE 2. Then the MME sends the proximity service request to the proximity service server, where the proximity service request sent by the MME carries the fixed identifier of UE 2.

Step 1508: The proximity service server records that UE 2 has a capability of discovering a proximate equipment, and sends a success response with respect to the proximity service request to the MME.

Specifically, after receiving the proximity service request sent by the MME, the proximity service server may determine, according to the equipment identifier of UE 2 which is carried in the proximity service request sent by the MME, that UE 2 has a capability of discovering a proximate equipment; then the proximity service server records that UE 2 has a capability of discovering a proximate equipment, and sends the success response with respect to the proximity service request to the MME; or after receiving the proximity service request sent by the MME, the proximity service server may determine, according to the equipment identifier of UE 2 which is carried in the proximity service request sent by the MME, that UE 2 has a capability of discovering a proximate equipment, and the proximity service server may query other network devices, for example, an HSS, a PCRF, or a charging network element, to decide whether UE 2 is allowed to discover a proximate equipment, and if yes, the proximity service server records that UE 2 has a capability of discovering a proximate equipment, and sends the success response with respect to the proximity service request to UE 2; if in step 1507, the MME has queried subscription data from the HSS and authenticated a subscription capability of UE 2, the proximity service server in step 1508 only needs to query the PCRF or charging network element to decide whether UE 2 is allowed to discover a proximate equipment, and if yes, records that UE 2 has a capability of discovering a proximate equipment, and sends the success response with respect to the proximity service request to the MME.

Step 1509: The MME sends a success response with respect to the proximity service request to UE 2.

Step 1510: After UE 2 receives the proximity service request success response, UE 2 starts to monitor broadcast information sent by other UEs than UE 2.

Specifically, when UE 2 monitors and obtains broadcast information of a UE, for example, UE 1, UE 2 may determine that UE 1 is a proximate equipment of UE 2, which indicates that UE 1 appears in a proximity range of UE 2; or after UE 2 monitors and obtains broadcast information of a UE, for example, UE 1, and attempts to perform a physical-layer interaction successfully, UE 2 may determine that UE 1 is a proximate equipment of UE 2, which indicates that UE 1 appears in a proximity range of UE 2.

Step 1511: UE 2 registers the monitored and obtained broadcast information of the proximate equipment, which is the broadcast information of UE 1 in this embodiment, with the proximity service server through the MME.

Step 1512: The proximity service server converts, according to the correspondence between the equipment identifier of UE 1 and the broadcast information which is stored in step 1503, the broadcast information of UE 1 into the equipment identifier of UE 1, and stores the equipment identifier of UE 1 into the proximate equipment identifier list of UE 2.

This embodiment is described by using an example in which UE 1 requests to be discovered by a proximate equipment and UE 2 requests to discover a proximate equipment for description, but the present invention is not limited thereto. The UE (for example, UE 1 and/or UE 2) may simultaneously request to discover a proximate equipment and request to be discovered by a proximate equipment.

In the above embodiment, after UE 2 monitors and obtains the broadcast information of UE 1 broadcast by UE 1, UE 2 determines that UE 1 is a proximate equipment of UE 2, thereby improving accuracy of proximity discovery and improving user experience; furthermore, UE 2 registers the broadcast information of UE 1 with the proximity service server through the MME, and the proximity service server maintains the proximate equipment identifier list of UE 2, thereby implementing a proximity discovery service under network control; in addition, in this embodiment, the proximity service server allocates broadcast information used for proximate equipment discovery to UE 1, so that the network can manage and control the proximity discovery service.

Figure 16:
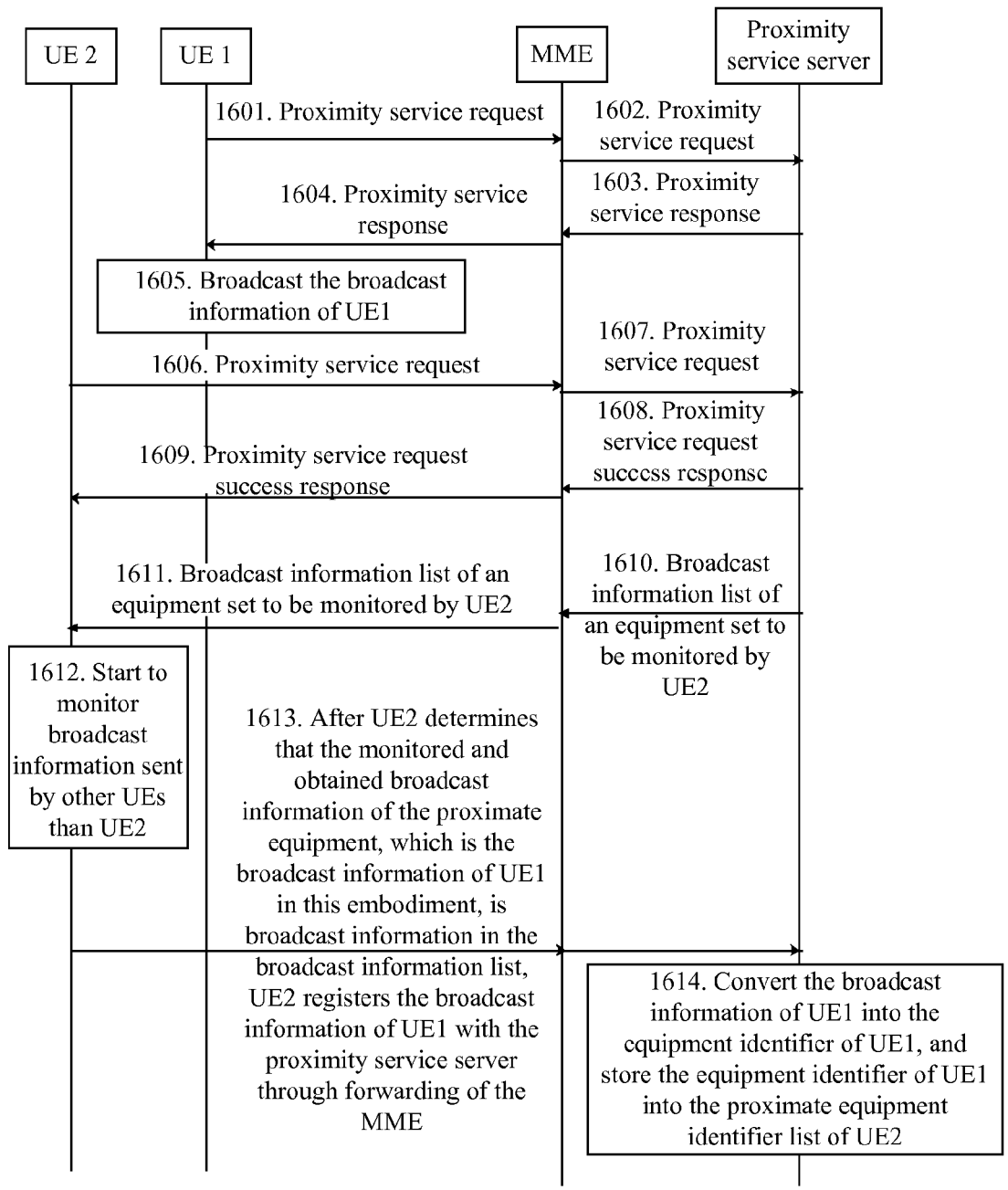
FIG. 16 is a flowchart of still another embodiment of a proximity information registration method according to the present invention.

FIG. 16 is a flowchart of still another embodiment of a proximity information registration method according to the present invention. As shown in FIG. 16, the proximity information registration method may include:

Step 1601 to step 1609: Same as step 1501 to step 1509.

Step 1610: The proximity service server sends, according to its configuration or a trigger of the application server, a broadcast information list of an equipment set to be monitored by UE 2 to the MME.

In this embodiment, step 1610 and step 1608 may occur simultaneously, and in this case, the configured broadcast information list may be added to the success response with respect to the proximity service request sent in step 1608; or, step 1610 may also occur at any time after step 1608, and in this case, the broadcast information list may be delivered by using a message different from that in step 1608.

Step 1611: The MME sends the broadcast information list of the equipment set to be monitored by UE 2 to UE 2.

Step 1612: UE 2 starts to monitor broadcast information sent by other UEs than UE 2.

Specifically, when UE 2 monitors and obtains broadcast information of a UE, for example, UE 1, UE 2 may determine that UE 1 is a proximate equipment of UE 2, which indicates that UE 1 appears in a proximity range of UE 2; or after UE 2 monitors and obtains broadcast information of a UE, for example, UE 1, and attempts to perform a physical-layer interaction successfully, UE 2 may determine that UE 1 is a proximate equipment of UE 2, which indicates that UE 1 appears in a proximity range of UE 2.

Step 1613: After UE 2 determines that the monitored and obtained broadcast information of the proximate equipment, which is the broadcast information of UE 1 in this embodiment, is broadcast information in the broadcast information list, UE 2 registers the broadcast information of UE 1 with the proximity service server through forwarding of the MME.

In this embodiment, UE 2 registers the broadcast information with the proximity service server only after monitoring and obtaining the broadcast information belonging to the configured broadcast information list.

Step 1614: Same as step 1512.

In this embodiment, UE 2 reports the proximate equipment information to the proximity service server through the MME only after monitoring and obtaining the broadcast information belonging to the broadcast information list of the equipment set to be monitored by UE 2. This can reduce the interactions between UE 2 and the network greatly, and reduce the network signaling load.

Figure 17:
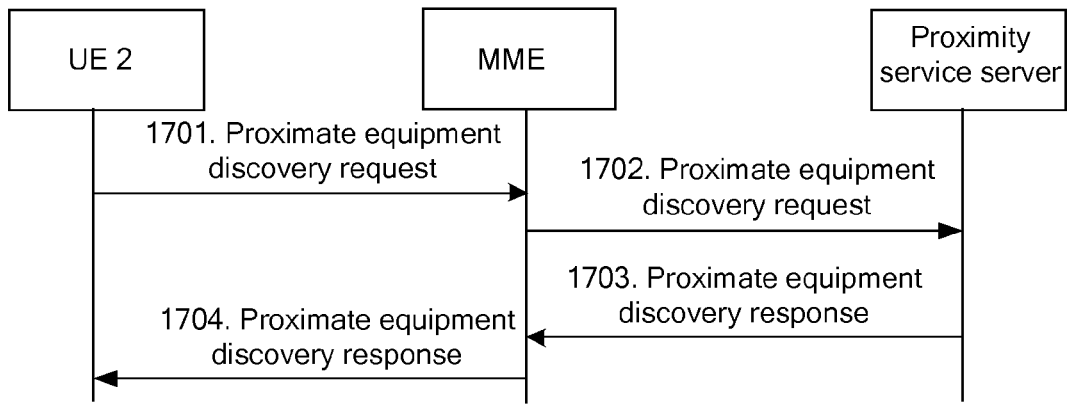
FIG. 17 is a flowchart of still another embodiment of a proximity information query method according to the present invention.

FIG. 17 is a flowchart of still another embodiment of a proximity information query method according to the present invention. As shown in FIG. 17, the proximity information query method may include:

Step 1701: UE 2 sends a proximate equipment discovery request to an MME.

Step 1702: The MME sends the proximate equipment discovery request to a proximity service server.

In this embodiment, before step 1702, the proximity service server has maintained a proximate equipment identifier list of UE 2; specifically, the proximity service server may obtain and maintain the proximate equipment identifier list of UE 2 according to the method provided by the embodiment shown in FIG. 1, FIG. 2, FIG. 15, or FIG. 16 of the present invention.

Step 1703: The proximity service server sends a proximate equipment discovery response to the MME.

Step 1704: The MME sends a proximate equipment discovery response to UE 2.

In an implementation manner of this embodiment, the proximate equipment discovery request in step 1701 and step 1702 carries an equipment identifier of UE 2; in the implementation manner, the proximate equipment discovery response in step 1703 and step 1704 carries a proximate equipment identifier list stored by the proximity service server and corresponding to the equipment identifier of UE 2, that is, the proximate equipment identifier list of UE 2.

In another implementation manner of this embodiment, the proximate equipment discovery request in step 1701 and step 1702 carries an equipment identifier of UE 2 and an equipment identifier of UE 1; in the implementation manner, the proximate equipment discovery response in step 1703 and step 1704 carries a proximity relationship query result, for example, UE 1 and UE 2 are in a proximity relationship, or UE 1 and UE 2 are not in a proximity relationship. Specifically, the proximity service server queries, according to the equipment identifier of UE 2 and the equipment identifier of UE 1, the proximate equipment identifier list stored by the proximity service server and corresponding to the equipment identifier of UE 2; if the proximity service server finds the equipment identifier of UE 1 in the proximate equipment identifier list, the proximate equipment discovery response in step 1703 and step 1704 carries the information that UE 1 is a proximate equipment of UE 2, that is, UE 1 and UE 2 are in a proximity relationship; if the proximity service server does not find the equipment identifier of UE 1 in the proximate equipment identifier list, the proximate equipment discovery response in step 1703 and step 1704 carries the information that UE 1 is not a proximate equipment of UE 2, that is, UE 1 and UE 2 are not in a proximity relationship.

In the above embodiment, after receiving the proximate equipment discovery request sent through the MME by UE 2, the proximity service server sends the proximate equipment discovery response to UE 2 through the MME according to information carried in the proximate equipment discovery request, thereby implementing a proximity discovery service under network control.

Figure 18:
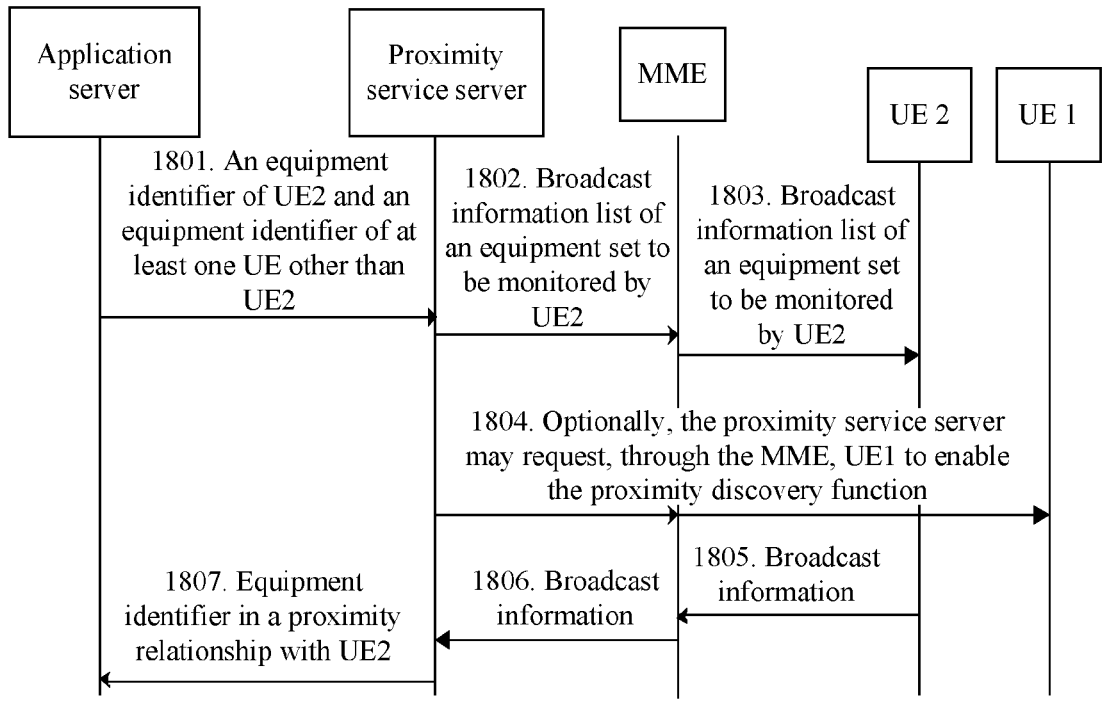
FIG. 18 is a flowchart of still another embodiment of a proximity information query method according to the present invention.

FIG. 18 is a flowchart of still another embodiment of a proximity information query method according to the present invention. As shown in FIG. 18, the proximity information query method may include:

Step 1801: An application server sends an equipment identifier of UE 2 and an equipment identifier of at least one UE other than UE 2 to a proximity service server, indicating that it is necessary to query a proximity relationship between UE 2 and the at least one UE.

Step 1802: The proximity service server obtains, according to a correspondence between the equipment identifier and broadcast information which is stored by the proximity service server, broadcast information of the at least one UE corresponding to the equipment identifier of the at least one UE, stores the broadcast information of the at least one UE into a broadcast information list of an equipment set to be monitored by UE 2, and sends the broadcast information list of the equipment set to be monitored by UE 2 to an MME.

Step 1803: The MME sends the broadcast information list of the equipment set to be monitored by UE 2 to UE 2.

Step 1804: Optionally, the proximity service server may request, through the MME, the equipment to be monitored by UE 2, which is UE 1 in this embodiment, to enable a proximity discovery function.

Specifically, the proximity service server may instruct, through the MME, UE 1 to broadcast the broadcast information of UE 1.

Step 1805: UE 2 monitors and obtains broadcast information belonging to the broadcast information list, and sends the broadcast information to the MME.

Step 1806: The MME sends the broadcast information to the proximity service server.

Step 1807: The proximity service server feeds back an equipment identifier in a proximity relationship with UE 2 to the application server.

The equipment identifier in a proximity relationship with UE 2 is obtained by the proximity service server according to the broadcast information in step 1806 and the correspondence between the equipment identifier and the broadcast information which is stored by the proximity service server.

In the above embodiment, after the proximity service server receives the equipment identifier sent by the application server, the proximity service server configures, through the MME, the broadcast information list of the equipment set to be monitored for UE 2; after UE 2 sends the monitored and obtained broadcast information belonging to the broadcast information list to the proximity service server through the MME, the proximity service server feeds back the equipment identifier in a proximity relationship with UE 2 to the application server, thereby implementing a proximity discovery service under network control and supporting an operator in reasonably controlling a provided service and benefiting from the service.

In addition, for the proximate user discovery method in the network architecture shown in FIG. 14, reference may be made to the method provided by the embodiment shown in FIG. 12 or FIG. 13 of the present invention, which is not further described herein.

Persons of ordinary skill in the art may understand that, all or a part of the steps in the foregoing method embodiments may be implemented by hardware instructed by a program. The program may be stored in a computer-readable storage medium. When the program runs, the steps of the method according to the embodiments are performed. The storage medium may be any medium capable of storing program code, such as a ROM, a RAM, a magnetic disk, or an optical disc.

Figure 19:
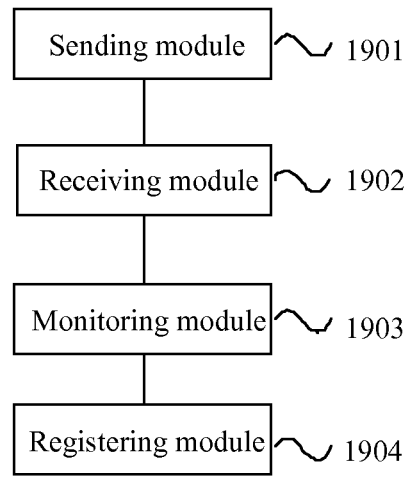
FIG. 19 is a schematic structural diagram of an embodiment of a user equipment according to the present invention.

FIG. 19 is a schematic structural diagram of an embodiment of a user equipment according to the present invention. The user equipment in this embodiment may implement the procedure of the embodiment shown in FIG. 1 of the present invention. As shown in FIG. 19, the user equipment may include: a sending module 1901, a receiving module 1902, a monitoring module 1903, and a registering module 1904.

The sending module 1901 is adapted to send a proximity service request to a proximity service server, where the proximity service request sent by the sending module 1901 carries an equipment identifier of the user equipment.

The receiving module 1902 is adapted to receive a success response sent by the proximity service server with respect to the proximity service request.

The monitoring module 1903 is adapted to monitor and obtain, after the receiving module 1902 receives the success response, broadcast information of at least one user equipment which is broadcast by the at least one user equipment other than the user equipment.

Specifically, after the monitoring module 1903 obtains the broadcast information of the at least one user equipment, the user equipment may determine that the at least one user equipment is a proximate equipment of the user equipment; or after the monitoring module 1903 obtains the broadcast information of the at least one user equipment, and performs a physical-layer interaction with the at least one user equipment successfully, the user equipment may determine that the at least one user equipment is a proximate equipment of the user equipment.

The registering module 1904 is adapted to register the broadcast information monitored and obtained by the monitoring module 1903 with the proximity service server, so that the proximity service server converts the broadcast information of the at least one user equipment into an equipment identifier of the at least one user equipment according to a correspondence between the equipment identifier of the at least one user equipment and the broadcast information of the at least one user equipment stored by the proximity service server and stores the equipment identifier of the at least one user equipment into a proximate equipment identifier list of the user equipment.

In an implementation manner of this embodiment, the sending module 1901 is specifically adapted to send a proximity service request to a mobility management entity, so that the mobility management entity sends a proximity service request to the proximity service server according to the proximity service request sent by the sending module 1901.

In the implementation manner, the registering module 1904 is specifically adapted to register the broadcast information obtained by the monitoring module 1903 with the proximity service server through the mobility management entity.

In the above embodiment, after the monitoring module 1903 monitors and obtains the broadcast information broadcast by at least one user equipment, it may be determined that the at least one user equipment is a proximate equipment of the user equipment, thereby improving accuracy of proximity discovery and improving user experience; furthermore, the registering module 1904 registers the broadcast information obtained by the monitoring module 1903 with the proximity service server, and the proximity service server maintains the proximate equipment identifier list of the user equipment, thereby implementing a proximity discovery service under network control; in addition, in this embodiment, the proximity service server allocates broadcast information used for proximate equipment discovery to the user equipment, so that a network can manage and control the proximity discovery service.

Figure 20:
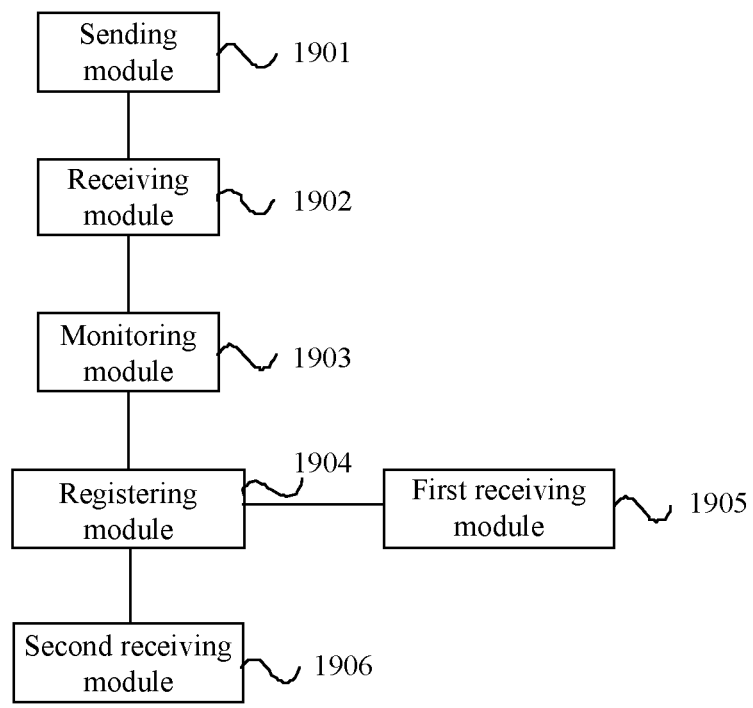
FIG. 20 is a schematic structural diagram of another embodiment of a user equipment according to the present invention.

FIG. 20 is a schematic structural diagram of another embodiment of a user equipment according to the present invention. Compared with the user equipment shown in FIG. 19, the difference lies in that the user equipment in this embodiment may further include: a first receiving module 1905, adapted to receive a broadcast information list of an equipment set to be monitored by the first user equipment, which is sent by the proximity service server. In this case, the registering module 1904 may register the broadcast information monitored and obtained by the monitoring module 1903 with the proximity service server after it is determined that the broadcast information monitored and obtained by the monitoring module 1903 is broadcast information in the broadcast information list.

The user equipment in this embodiment may further include: a second receiving module 1906, adapted to receive a broadcast information list of an equipment set to be monitored by the user equipment, which is sent by a mobility management entity. The broadcast information list of the equipment set to be monitored by the user equipment, which is sent by the mobility management entity, is sent by the proximity service server to the mobility management entity.

In this case, the registering module 1904 is specifically adapted to register the broadcast information monitored and obtained by the monitoring module 1903 with the proximity service server through the mobility management entity after it is determined that the broadcast information monitored and obtained by the monitoring module 1903 is broadcast information in the broadcast information list.

The user equipment reports the proximate equipment information to the proximity service server only after monitoring and obtaining the broadcast information belonging to the broadcast information list of the equipment set to be monitored by the user equipment. This can reduce the interactions between the user equipment and the network greatly, and reduce the network signaling load.

Figure 21:
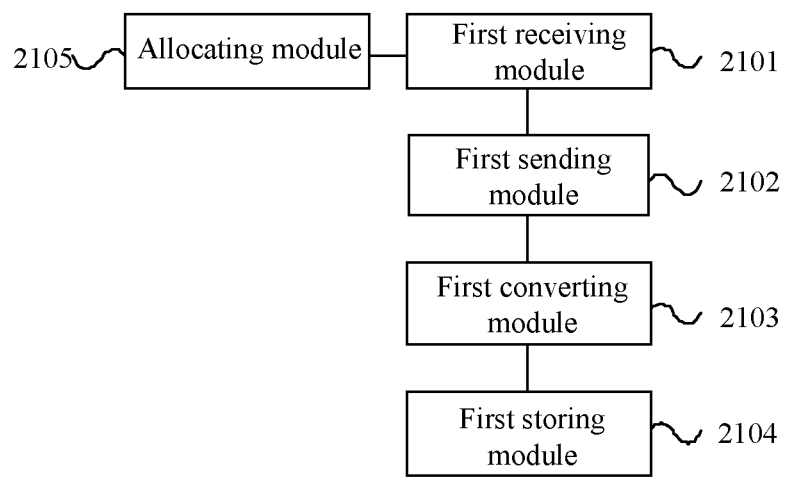
FIG. 21 is a schematic structural diagram of an embodiment of a proximity service server according to the present invention.

FIG. 21 is a schematic structural diagram of an embodiment of a proximity service server according to the present invention. The proximity service server in this embodiment may implement the procedure of the embodiment shown in FIG. 2 of the present invention. As shown in FIG. 21, the proximity service server may include: a first receiving module 2101, a first sending module 2102, a first converting module 2103, and a first storing module 2104.

The first receiving module 2101 is adapted to receive a proximity service request sent by a first user equipment, where the proximity service request sent by the first user equipment carries an equipment identifier of the first user equipment, and receive broadcast information of a second user equipment which is monitored and obtained by the first user equipment and sent by the first user equipment.

The first sending module 2102 is adapted to send a success response corresponding to the proximity service request to the first user equipment.

The first converting module 2103 is adapted to convert the broadcast information of the second user equipment into an equipment identifier of the second user equipment according to a correspondence between the equipment identifier of the second user equipment and the broadcast information of the second user equipment stored by the proximity service server.

The first storing module 2104 is adapted to store the equipment identifier of the second user equipment into a proximate equipment identifier list of the first user equipment.

In an implementation manner of this embodiment, further, the proximity service server may further include: an allocating module 2105.

In the implementation manner, the first receiving module 2101 is further adapted to receive a proximity service request sent by the second user equipment, where the proximity service request sent by the second user equipment carries the equipment identifier of the second user equipment; and the allocating module 2105 is adapted to allocate broadcast information to the second user equipment, store the correspondence between the equipment identifier of the second user equipment and the broadcast information of the second user equipment, and send the broadcast information of the second user equipment to the second user equipment.

In the implementation manner, when the proximity service request sent by the first user equipment carries information indicating that the first user equipment requests to discover a proximate equipment, the first sending module 2102 is specifically adapted to send the success response to the first user equipment after the proximity service server determines to allow the first user equipment to use a proximity service.

The allocating module 2105 is specifically adapted to allocate the broadcast information to the second user equipment when the proximity service request sent by the second user equipment carries information indicating that the second user equipment requests to be discovered by a proximate equipment.

In another implementation manner of this embodiment, the first receiving module 2101 is specifically adapted to receive the proximity service request sent through a mobility management entity by the first user equipment, and receive the broadcast information of the second user equipment which is sent through the mobility management entity by the first user equipment.

Further, the first sending module 2102 is further adapted to send a broadcast information list of an equipment set to be monitored by the first user equipment to the first user equipment; and the first receiving module 2101 is specifically adapted to receive the broadcast information of the second user equipment which is sent by the first user equipment after the first user equipment determines that the broadcast information of the second user equipment is broadcast information in the broadcast information list.

Further, the first sending module 2102 is further adapted to send a broadcast information list of an equipment set to be monitored by the first user equipment to the first user equipment through the mobility management entity; and the first receiving module 2101 is specifically adapted to receive the broadcast information of the second user equipment which is sent through the mobility management entity by the first user equipment after the first user equipment determines that the broadcast information of the second user equipment is broadcast information in the broadcast information list.

The proximity service server maintains the proximate equipment identifier list of the first user equipment, thereby implementing a proximity discovery service under network control; in addition, in this embodiment, the proximity service server allocates broadcast information used for proximate equipment discovery to the user equipment, so that a network can manage and control the proximity discovery service.

Figure 22:
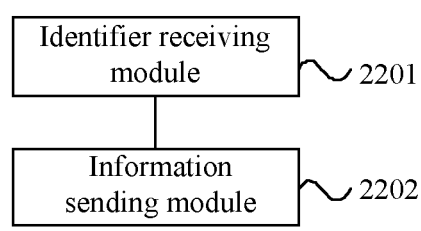
FIG. 22 is a schematic structural diagram of another embodiment of a proximity service server according to the present invention.

FIG. 22 is a schematic structural diagram of another embodiment of a proximity service server according to the present invention. The proximity service server in this embodiment may implement the method provided by the embodiment shown in FIG. 3 of the present invention. As shown in FIG. 22, the proximity service server may include: an identifier receiving module 2201 and an information sending module 2202.

The identifier receiving module 2201 is adapted to receive an equipment identifier sent by an application server; and in this case, the information sending module 2202 is adapted to send information of a proximate equipment which is stored by the proximity service server and corresponding to the equipment identifier received by the identifier receiving module 2201 to the application server; or the identifier receiving module 2201 is adapted to receive an equipment identifier sent by a first user equipment; and the information sending module 2202 is adapted to send information of a proximate equipment which is stored by the proximity service server and corresponding to the equipment identifier received by the identifier receiving module 2201 to the first user equipment.

Specifically, in an implementation manner of this embodiment, when the equipment identifier includes an equipment identifier of the first user equipment, the information sending module 2202 may send a proximate equipment identifier list stored by the proximity service server and corresponding to the equipment identifier of the first user equipment to the application server or the first user equipment.

In another implementation manner of this embodiment, when the equipment identifier includes an equipment identifier of the first user equipment and an equipment identifier of a second user equipment, the information sending module 2202 may feed back that the second user equipment is a proximate equipment of the first user equipment or that the second user equipment is not a proximate equipment of the first user equipment, to the application server or first user equipment.

In the above embodiment, after the identifier receiving module 2201 receives an equipment identifier, the information sending module 2202 sends information of a proximate equipment corresponding to the equipment identifier to the application server or first user equipment, thereby implementing a proximity discovery service under network control.

Figure 23:
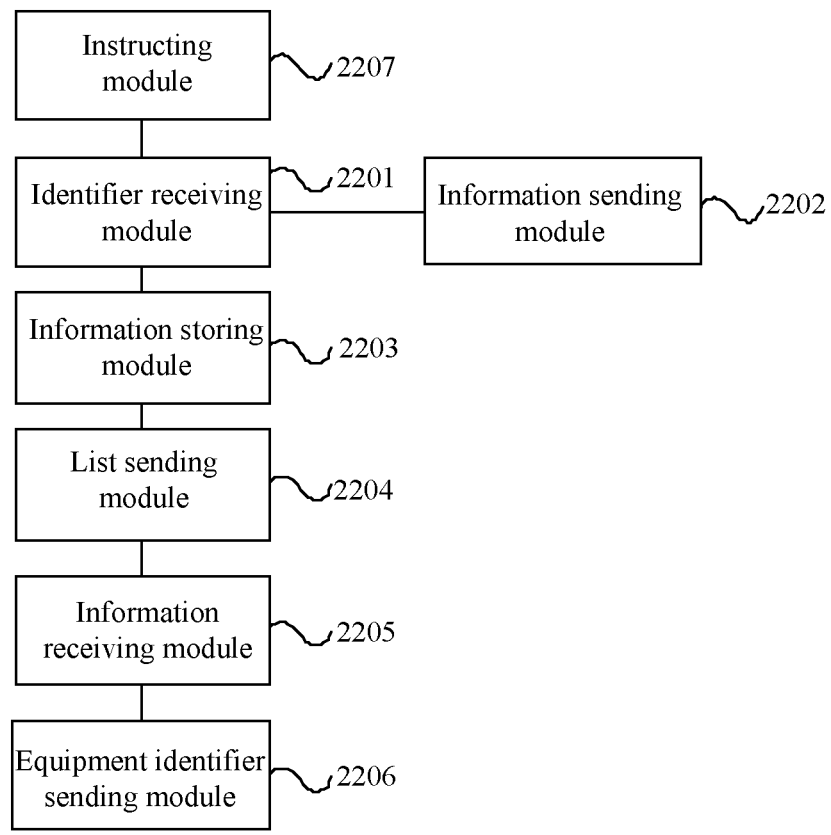
FIG. 23 is a schematic structural diagram of still another embodiment of a proximity service server according to the present invention.

FIG. 23 is a schematic structural diagram of still another embodiment of a proximity service server according to the present invention. Compared with the proximity service server shown in FIG. 22, the difference lies in that, in the proximity service server shown in FIG. 23, the identifier receiving module 2201 may receive an equipment identifier of the first user equipment and an equipment identifier of at least one user equipment other than the first user equipment which are sent by the application server.

Further, the proximity service server may further include: an information storing module 2203, a list sending module 2204, an information receiving module 2205, and an equipment identifier sending module 2206.

The information storing module 2203 is adapted to obtain according to a correspondence between the equipment identifier and broadcast information which is stored by the proximity service server, broadcast information of the at least one user equipment corresponding to the equipment identifier of the at least one user equipment which is received by the identifier receiving module 2201, and store the broadcast information of the at least one user equipment into a broadcast information list of an equipment set to be monitored by the first user equipment.

The list sending module 2204 is adapted to send the broadcast information list of the equipment set to be monitored by the first user equipment to the first user equipment.

The information receiving module 2205 is adapted to receive broadcast information belonging to the broadcast information list and monitored and obtained by the first user equipment.

The equipment identifier sending module 2206 is adapted to obtain, according to the correspondence between the equipment identifier and the broadcast information which is stored by the proximity service server, an equipment identifier corresponding to the broadcast information received by the information receiving module 2205, and send the equipment identifier corresponding to the broadcast information to the application server, where the equipment identifier corresponding to the broadcast information is an equipment identifier of a proximate equipment of the first user equipment.

Further, the proximity service server may further include:
an instructing module 2207, adapted to instruct, according to the equipment identifier of the at least one equipment, the at least one equipment to broadcast its broadcast information.

In an implementation manner of this embodiment, the identifier receiving module 2201 is specifically adapted to receive the equipment identifier sent through a mobility management entity by the first user equipment.

In this case, the information sending module 2202 is specifically adapted to: when the equipment identifier includes an equipment identifier of the first user equipment, send a proximate equipment identifier list stored by the proximity service server and corresponding to the equipment identifier of the first user equipment to the first user equipment through the mobility management entity; and when the equipment identifier includes an equipment identifier of the first user equipment and an equipment identifier of a second user equipment, feed back that the second user equipment is a proximate equipment of the first user equipment or that the second user equipment is not a proximate equipment of the first user equipment, to the first user equipment through the mobility management entity.

In the implementation manner, the list sending module 2204 is specifically adapted to send the broadcast information list of the equipment set to be monitored by the first user equipment to the first user equipment through the mobility management entity; and the information receiving module 2205 is specifically adapted to receive the broadcast information belonging to the broadcast information list and monitored and obtained by the first user equipment and sent through the mobility management entity by the first user equipment.

In the implementation manner, the instructing module 2207 is specifically adapted to instruct, according to the equipment identifier of the at least one equipment through the mobility management entity, the at least one equipment to broadcast its broadcast information.

In the above embodiment, the list sending module 2204 sends the broadcast information list of the equipment set to be monitored by the first user equipment to the first user equipment; the information receiving module 2205 receives the broadcast information belonging to the broadcast information list and monitored and obtained by the first user equipment. Therefore, the interactions between the first user equipment and the proximity service server can be reduced, and the network signaling overhead is reduced; in addition, under network control, a proximity discovery service can be implemented.

Figure 24:
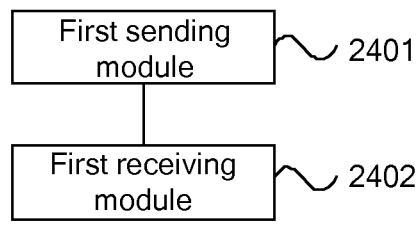
FIG. 24 is a schematic structural diagram of still another embodiment of a user equipment according to the present invention.

FIG. 24 is a schematic structural diagram of still another embodiment of a user equipment according to the present invention. The user equipment in this embodiment may implement the procedure of the embodiment shown in FIG. 4 of the present invention. As shown in FIG. 24, the user equipment may include: a first sending module 2401 and a first receiving module 2402.

The first sending module 2401 is adapted to send an equipment identifier to a proximity service server.

The first receiving module 2402 is adapted to receive information of a proximate equipment which is sent by the proximity service server and corresponding to the equipment identifier.

In an implementation manner of this embodiment, when the equipment identifier includes an equipment identifier of the user equipment, the first receiving module 2402 is specifically adapted to receive a proximate equipment identifier list sent by the proximity service server and corresponding to the equipment identifier of the user equipment.

In another implementation manner of this embodiment, when the equipment identifier includes an equipment identifier of the user equipment and an equipment identifier of another user equipment than the user equipment, the first receiving module 2402 is specifically adapted to receive information fed back by the proximity service server, where the information indicates that the another user equipment is a proximate equipment of the user equipment or that the another user equipment is not a proximate equipment of the user equipment.

In still another implementation manner of this embodiment, the first receiving module 2402 is further adapted to receive a broadcast information list of an equipment set to be monitored by the user equipment, which is sent by the proximity service server; and the first sending module 2401 is further adapted to send broadcast information belonging to the broadcast information list and monitored and obtained by the user equipment to the proximity service server;

where, the broadcast information list of the equipment set to be monitored by the user equipment is sent to the user equipment after the proximity service server receives an equipment identifier of the user equipment and an equipment identifier of at least one user equipment other than the user equipment which are sent by an application server, obtains broadcast information of the at least one user equipment corresponding to the equipment identifier of the at least one user equipment according to a correspondence between the equipment identifier and the broadcast information which is stored by the proximity service server, and stores the broadcast information of the at least one user equipment into the broadcast information list of the equipment set to be monitored by the user equipment.

In still another implementation manner of this embodiment, the first sending module 2401 is specifically adapted to send an equipment identifier to the proximity service server through a mobility management entity.

When the equipment identifier includes an equipment identifier of the user equipment, the first receiving module 2402 is specifically adapted to receive a proximate equipment identifier list stored by the proximity service server and corresponding to the equipment identifier of the user equipment, which is sent by the proximity service server through the mobility management entity.

When the equipment identifier includes an equipment identifier of the user equipment and an equipment identifier of another user equipment than the user equipment, the first receiving module 2402 is specifically adapted to receive information fed back through the mobility management entity by the proximity service server, where the information indicates that the another user equipment is a proximate equipment of the user equipment or that the another user equipment is not a proximate equipment of the user equipment.

In still another implementation manner of this embodiment, the first receiving module 2402 is specifically adapted to receive the broadcast information list of the equipment set to be monitored by the user equipment, which is sent by the proximity service server through the mobility management entity; and the first sending module 2401 is specifically adapted to send the broadcast information belonging to the broadcast information list and monitored and obtained by the user equipment to the proximity service server through the mobility management entity.

The above embodiment can reduce the interactions between the user equipment and the proximity service server, and reduce the network signaling overhead, and implement a proximity discovery service under network control.

Figure 25:
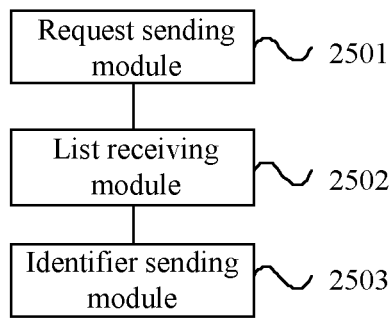
FIG. 25 is a schematic structural diagram of an embodiment of an application server according to the present invention.

FIG. 25 is a schematic structural diagram of an embodiment of an application server according to the present invention. The application server in this embodiment may implement the procedure of the embodiment shown in FIG. 5 of the present invention. As shown in FIG. 25, the application server may include: a request sending module 2501, a list receiving module 2502, and an identifier sending module 2503.

The request sending module 2501 is adapted to send a proximity query request to a proximity service server, where the proximity query request carries an equipment identifier of a user equipment that needs to discover a proximate user; specifically, the request sending module 2501 may send the proximity query request to the proximity service server after the application server receives the proximate user discovery request sent by the user equipment, where the proximate user discovery request is a request for discovering a user using the same application as the user using the user equipment.

The list receiving module 2502 is adapted to receive a proximate equipment identifier list sent by the proximity service server and corresponding to the equipment identifier.

The identifier sending module 2503 is adapted to obtain a user identifier corresponding to the equipment identifier in the proximate equipment identifier list according to a correspondence between the equipment identifier and the user identifier which is stored by the application server, and send the obtained user identifier to the user equipment.

In the above embodiment, after the request sending module 2501 sends the equipment identifier of the user equipment that needs to discover a proximate user to the proximity service server, the list receiving module 2502 receives the proximate equipment identifier list of the user equipment which is sent by the proximity service server; then the identifier sending module 2503 obtains the user identifier corresponding to the equipment identifier in the proximate equipment identifier list according to the correspondence between the equipment identifier and the user identifier which is stored by the application server, and then sends the obtained user identifier to the user equipment. Therefore, under network control, a user using the user equipment can discover a proximate user using the same application as the user.

Figure 26:
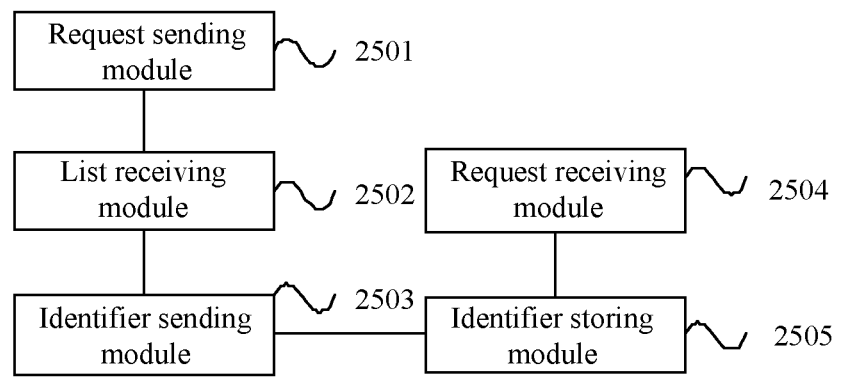
FIG. 26 is a schematic structural diagram of another embodiment of an application server according to the present invention.

FIG. 26 is a schematic structural diagram of another embodiment of an application server according to the present invention. Compared with the application server shown in FIG. 25, the difference lies in that the application server shown in FIG. 26 may further include: a request receiving module 2504 and an identifier storing module 2505.

The request receiving module 2504 is adapted to receive a user registration request sent by a user equipment, where the user registration request carries an equipment identifier of the user equipment and a user identifier of a user using the user equipment.

The identifier storing module 2505 is adapted to store a correspondence between the equipment identifier of the user equipment and the user identifier.

In an implementation manner of this embodiment, the proximity query request sent by the request sending module 2501 further carries an equipment identifier of a proximate equipment to be monitored by the user equipment, where the equipment identifier of the proximate equipment to be monitored by the user equipment is determined by the application server according to application-layer information of the user equipment.

In the implementation manner, the list receiving module 2502 is specifically adapted to receive a proximate equipment identifier list corresponding to the equipment identifier and sent by the proximity service server after the proximate equipment identifier list stored by the proximity service server and corresponding to the equipment identifier changes.

In another implementation manner of this embodiment, the proximity query request sent by the request sending module 2501 further carries a feedback period that the application server subscribes to from the proximity service server.

In the implementation manner, the list receiving module 2502 is specifically adapted to receive a proximate equipment identifier list of the user equipment, which is fed back by the proximity service server according to the feedback period.

In the above embodiment, under network control, a user using the user equipment can discover a proximate user using the same application as the user.

Figure 27:
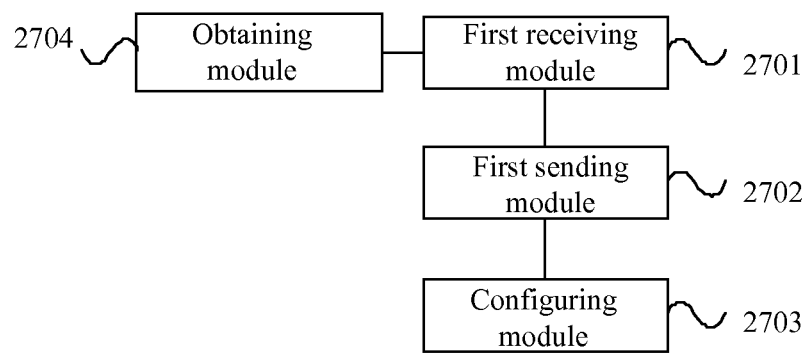
FIG. 27 is a schematic structural diagram of still another embodiment of a proximity service server according to the present invention.

FIG. 27 is a schematic structural diagram of still another embodiment of a proximity service server according to the present invention. The proximity service server in this embodiment may implement the procedure of the embodiment shown in FIG. 6 of the present invention. As shown in FIG. 27, the proximity service server may include: a first receiving module 2701 and a first sending module 2702.

The first receiving module 2701 is adapted to receive a proximity query request sent by an application server, where the proximity query request carries an equipment identifier of a user equipment that needs to discover a proximate user.

The first sending module 2702 is adapted to send a proximate equipment identifier list corresponding to the equipment identifier to the application server, so that the application server obtains a user identifier corresponding to the equipment identifier in the proximate equipment identifier list according to a correspondence between the equipment identifier and the user identifier which is stored by the application server and sends the obtained user identifier to the user equipment.

Specifically, the first receiving module 2701 may receive a proximity query request sent, after the application server receives a proximate user discovery request sent by the user equipment, by the application server.

In this embodiment, the proximity query request received by the first receiving module 2701 further carries an equipment identifier of a proximate equipment to be monitored by the user equipment, where the equipment identifier of the proximate equipment to be monitored by the user equipment is determined by the application server according to application-layer information of the user equipment.

In this case, the first sending module 2702 may send a proximate equipment identifier list corresponding to the equipment identifier to the application server after the proximate equipment identifier list stored by the proximity service server and corresponding to the equipment identifier changes.

In an implementation manner of this embodiment, further, the proximity service server may further include: a configuring module 2703 and an obtaining module 2704.

The configuring module 2703 is adapted to configure, according to the equipment identifier of the proximate equipment to be monitored by the user equipment, a broadcast information list of an equipment set to be monitored by the user equipment.

In this case, the first sending module 2702 is further adapted to send the broadcast information list of the equipment set to be monitored by the user equipment, which is configured by the configuring module 2703, to the user equipment.

The first receiving module 2701 is further adapted to receive broadcast information belonging to the broadcast information list and monitored and obtained by the user equipment.

The obtaining module 2704 is adapted to obtain, according to the broadcast information received by the first receiving module 2701 and a correspondence between the equipment identifier and the broadcast information which is stored by the proximity service server, the proximate equipment identifier list corresponding to the equipment identifier.

In the above embodiment, under network control, a user using the user equipment can discover a proximate user using the same application as the user.

Figure 28:
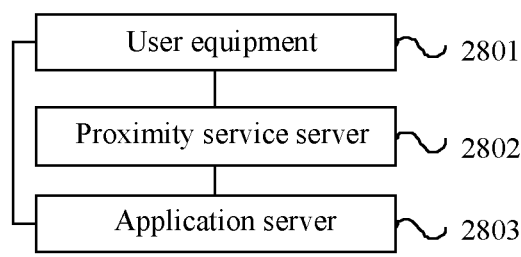
FIG. 28 is a schematic structural diagram of an embodiment of a system for implementing a proximity service according to the present invention.

FIG. 28 is a schematic structural diagram of an embodiment of a system for implementing a proximity service according to the present invention. As shown in FIG. 28, the system for implementing a proximity service may include: a user equipment 2801, a proximity service server 2802, and an application server 2803.

The user equipment 2801 is adapted to: send a proximity service request to the proximity service server 2802, where the proximity service request sent by the user equipment 2801 carries an equipment identifier of the user equipment 2801; after receiving a success response sent by the proximity service server with respect to the proximity service request, monitor and obtain broadcast information of at least one user equipment which is broadcast by the at least one user equipment other than the user equipment 2801, and register the broadcast information of the at least one user equipment with the proximity service server 2802. Specifically, the user equipment 2801 may be implemented by the user equipment provided by the embodiment shown in FIG. 19, FIG. 20, or FIG. 24 of the present invention.

The proximity service server 2802 is adapted to: convert the broadcast information of the at least one user equipment into an equipment identifier of the at least one user equipment according to a correspondence between the equipment identifier of the at least one user equipment and the broadcast information of the at least one user equipment stored by the proximity service server, and store the equipment identifier of the at least one user equipment into a proximate equipment identifier list of the user equipment 2801; and receive the equipment identifier of the user equipment 2801 sent by the application server 2803, and send the proximate equipment identifier list of the user equipment 2801 to the application server 2803. Specifically, the proximity service server 2802 may be implemented by the proximity service server provided by the embodiment shown in FIG. 21, FIG. 22, FIG. 23, or FIG. 27 of the present invention.

The application server 2803 is adapted to obtain a user identifier corresponding to the equipment identifier in the proximate equipment identifier list of the user equipment 2801 according to a correspondence between the equipment identifier and the user identifier which is stored by the application server 2803, and send the obtained user identifier to the user equipment 2801. Specifically, the application server 2803 may be implemented by the application server shown in FIG. 25 or FIG. 26 of the present invention.

The user equipment 2801, the proximity service server 2802, and the application server 2803 in this embodiment may perform interactions according to the procedures provided by the embodiments shown in FIG. 8 to FIG. 13, which is not further described herein.

In addition, in a specific implementation, the user equipment 2801, proximity service server 2802, and application server 2803, and an HSS, a PCRF, an MME, and a base station (evolved NodeB, hereinafter briefly referred to as eNB) may form the network architecture shown in FIG. 7.

The above system can implement a proximity discovery service under network control, and improve accuracy of proximity discovery; in addition, under network control, a user using the user equipment can discover a proximate user using the same application as the user by using the system.

Figure 29:
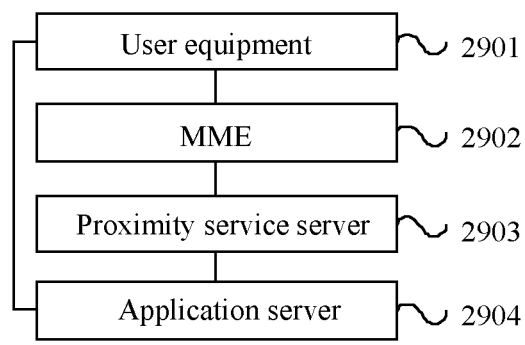
FIG. 29 is a schematic structural diagram of another embodiment of a system for implementing a proximity service according to the present invention.

FIG. 29 is a schematic structural diagram of another embodiment of a system for implementing a proximity service according to the present invention. As shown in FIG. 29, the system for implementing a proximity service may include: a user equipment 2901, an MME 2902, a proximity service server 2903, and an application server 2904.

The user equipment 2901 is adapted to: send a proximity service request to the MME 2902, where the proximity service request sent by the user equipment 2901 carries an equipment identifier of the user equipment 2901; and after receiving a success response sent by the MME 2902, monitor and obtain broadcast information of at least one user equipment which is broadcast by the at least one user equipment other than the user equipment 2901, and send the broadcast information of the at least one user equipment to the MME 2902. Specifically, the user equipment 2901 may be implemented by the user equipment provided by the embodiment shown in FIG. 19, FIG. 20 or FIG. 24 of the present invention.

The MME 2902 is adapted to: send a proximity service request to the proximity service server according to the proximity service request sent by the user equipment 2901, and receive a success response sent by the proximity service server 2903 with respect to the proximity service request, and send the success response to the user equipment 2901; and receive the broadcast information of the at least one user equipment which is sent by the user equipment 2901, and register the broadcast information of the at least one user equipment with the proximity service server 2903.

The proximity service server 2903 is adapted to: convert the broadcast information of the at least one user equipment into an equipment identifier of the at least one user equipment according to a correspondence between the equipment identifier of the at least one user equipment and the broadcast information of the at least one user equipment stored by the proximity service server 2903, and store the equipment identifier of the at least one user equipment into a proximate equipment identifier list of the user equipment 2901; and receive the equipment identifier of the user equipment 2901 which is sent by the application server 2904, and send the proximate equipment identifier list of the user equipment 2901 to the application server 2904. Specifically, the proximity service server 2903 may be implemented by the proximity service server provided by the embodiment shown in FIG. 21, FIG. 22, FIG. 23, or FIG. 27 of the present invention.

The application server 2904 is adapted to obtain a user identifier corresponding to the equipment identifier in the proximate equipment identifier list of the user equipment 2901 according to a correspondence between the equipment identifier and the user identifier which is stored by the application server 2904, and send the obtained user identifier to the user equipment 2901. Specifically, the application server 2904 may be implemented by the application server shown in FIG. 25 or FIG. 26 of the present invention.

The user equipment 2901, the MME 2902, the proximity service server 2903, and the application server 2904 in this embodiment may perform interactions according to the procedures provided by the embodiments shown in FIG. 12 to FIG. 13, and FIG. 15 to FIG. 18, which is not further described herein.

In addition, in a specific implementation, the user equipment 2901, the MME 2902, the proximity service server 2903, and the application server 2904, and an HSS, a PCRF, and an eNB may form the network architecture shown in FIG. 14.

The above system can implement a proximity discovery service under network control, and improve accuracy of proximity discovery; in addition, under network control, a user using the user equipment can discover a proximate user using the same application as the user by using the system.

Persons skilled in the art may understand that the accompanying drawings are only schematic diagrams of the exemplary embodiments of the present invention and that the modules or procedures in the accompanying drawings may be not necessary for the implementation of the present invention.

Persons skilled in the art may understand that, the modules in the apparatuses provided in the embodiments may be arranged in the apparatuses in a distributed manner according to the description of the embodiments, or may be arranged in one or a plurality of apparatuses which are different from those described in the embodiments. The modules in the foregoing embodiments may be combined into one module, or split into a plurality of sub-modules.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that, they may still make modifications to the technical solutions described in the foregoing embodiments, or make equivalent replacements to some or all the technical features thereof, as long as these modifications or replacements do not cause the essence of corresponding technical solutions to depart from the spirit and scope of the technical solutions of the embodiments of the present invention.

What is claimed is:

1. A proximity information registration method, comprising:
sending, by a first user equipment, a proximity service request to a proximity service server, wherein the proximity service request sent by the first user equipment carries an equipment identifier of the first user equipment;
after the first user equipment receives a success response sent by the proximity service server with respect to the proximity service request, monitoring and obtaining, by the first user equipment, broadcast information of a second user equipment which is broadcast by the second user equipment; and
registering, by the first user equipment, the broadcast information of the second user equipment with the proximity service server, so that the proximity service server converts the broadcast information of the second user equipment into an equipment identifier of the second user equipment according to a correspondence between the equipment identifier of the second user equipment and the broadcast information of the second user equipment stored by the proximity service server and stores the equipment identifier of the second user equipment into a proximate equipment identifier list of the first user equipment.

2. The method according to claim 1, wherein: the broadcast information of the second user equipment is allocated to the second user equipment and sent to the second user equipment after the proximity service server receives a proximity service request sent by the second user equipment; and the proximity service request sent by the second user equipment carries the equipment identifier of the second user equipment, and the proximity service server stores the correspondence.

3. The method according to claim 2, wherein: the proximity service request sent by the second user equipment further carries information indicating that the second user equipment requests to be discovered by a proximate equipment; and
when the proximity service request sent by the second user equipment carries the information indicating that the second user equipment requests to be discovered by a proximate equipment, the broadcast information of the second user equipment is allocated to the second user equipment and sent to the second user equipment by the proximity service server after the proximity service server receives the proximity service request sent by the second user equipment.

4. The method according to claim 1, wherein: the proximity service request sent by the first user equipment further carries information indicating that the first user equipment requests to discover a proximate equipment; and
when the proximity service request sent by the first user equipment carries the information indicating that the first user equipment requests to discover a proximate equipment, the success response received by the first user equipment is sent by the proximity service server after the proximity service server determines to allow the first user equipment to use a proximity service.

5. The method according to claim 1, wherein the sending, by a first user equipment, a proximity service request to a proximity service server comprises:
sending, by the first user equipment, a proximity service request to a mobility management entity, so that the mobility management entity sends a proximity service request to the proximity service server according to the proximity service request sent by the first user equipment.

6. The method according to claim 5, wherein the registering, by the first user equipment, the broadcast information of the second user equipment with the proximity service server comprises:
registering, by the first user equipment, the broadcast information of the second user equipment with the proximity service server through the mobility management entity.

7. The method according to claim 6, wherein: after the sending, by the first user equipment, a proximity service request to a mobility management entity, the method further comprises:
receiving, by the first user equipment, a broadcast information list of an equipment set to be monitored by the first user equipment, which is sent by the mobility management entity, wherein the broadcast information list of the equipment set to be monitored by the first user equipment is sent to the mobility management entity by the proximity service server; and
the registering, by the first user equipment, the broadcast information of the second user equipment with the proximity service server through the mobility management entity comprises:
registering, by the first user equipment, the broadcast information of the second user equipment with the proximity service server through the mobility management entity after determining that the broadcast information of the second user equipment is broadcast information in the broadcast information list.

8. The method according to claim 1, wherein: after the sending, by a first user equipment, a proximity service request to a proximity service server, the method further comprises:
receiving, by the first user equipment, a broadcast information list of an equipment set to be monitored by the first user equipment, which is sent by the proximity service server; and
the registering, by the first user equipment, the broadcast information of the second user equipment with the proximity service server comprises:
registering, by the first user equipment, the broadcast information of the second user equipment with the proximity service server after determining that the broadcast information of the second user equipment is broadcast information in the broadcast information list.

9. A proximity information registration method, comprising:
receiving, by a proximity service server, a proximity service request sent by a first user equipment, wherein the proximity service request sent by the first user equipment carries an equipment identifier of the first user equipment;
sending, by the proximity service server, a success response corresponding to the proximity service request to the first user equipment, and receiving broadcast information of a second user equipment which is monitored and obtained by the first user equipment and sent by the first user equipment; and
converting, by the proximity service server, the broadcast information of the second user equipment into an equipment identifier of the second user equipment according to a correspondence between the equipment identifier of the second user equipment and the broadcast information of the second user equipment stored by the proximity service server, and storing the equipment identifier of the second user equipment into a proximate equipment identifier list of the first user equipment.

10. The method according to claim 9, wherein before the converting, by the proximity service server, the broadcast information of the second user equipment into an equipment identifier of the second user equipment according to a correspondence between the equipment identifier of the second user equipment and the broadcast information of the second user equipment stored by the proximity service server, the method further comprises:
  receiving, by the proximity service server, a proximity service request sent by the second user equipment, wherein the proximity service request sent by the second user equipment carries the equipment identifier of the second user equipment; and
  allocating, by the proximity service server, the broadcast information to the second user equipment, storing the correspondence between the equipment identifier of the second user equipment and the broadcast information of the second user equipment, and sending the broadcast information of the second user equipment to the second user equipment.

11. The method according to claim 10, wherein the allocating, by the proximity service server, the broadcast information to the second user equipment comprises:
  allocating, by the proximity service server, the broadcast information to the second user equipment when the proximity service request sent by the second user equipment carries information indicating that the second user equipment requests to be discovered by a proximate equipment.

12. The method according to claim 9, wherein the sending, by the proximity service server, a success response corresponding to the proximity service request to the first user equipment comprises:
  when the proximity service request sent by the first user equipment carries information indicating that the first user equipment requests to discover a proximate equipment, sending, by the proximity service server, the success response to the first user equipment after the proximity service server determines to allow the first user equipment to use a proximity service.

13. The method according to claim 9, wherein the receiving, by a proximity service server, a proximity service request sent by a first user equipment comprises:
  receiving, by the proximity service server, the proximity service request sent through a mobility management entity by the first user equipment.

14. The method according to claim 13, wherein the receiving broadcast information of a second user equipment which is monitored and obtained by the first user equipment and sent by the first user equipment comprises:
  receiving, by the proximity service server, the broadcast information of the second user equipment which is sent through the mobility management entity by the first user equipment.

15. The method according to claim 14, wherein: after the receiving, by the proximity service server, the proximity service request sent through a mobility management entity by the first user equipment, the method further comprises:
  sending, by the proximity service server, a broadcast information list of an equipment set to be monitored by the first user equipment to the first user equipment through the mobility management entity; and
  the receiving, by the proximity service server, the broadcast information of the second user equipment which is sent through the mobility management entity by the first user equipment comprises:
  receiving, by the proximity service server, the broadcast information of the second user equipment which is sent through the mobility management entity by the first user equipment after the first user equipment determines that the broadcast information of the second user equipment is broadcast information in the broadcast information list.

16. The method according to claim 9, wherein: after the receiving, by a proximity service server, a proximity service request sent by a first user equipment, the method further comprises:
  sending, by the proximity service server, a broadcast information list of an equipment set to be monitored by the first user equipment to the first user equipment; and
  the receiving broadcast information of a second user equipment which is monitored and obtained by the first user equipment and sent by the first user equipment comprises:
  receiving, by the proximity service server, the broadcast information of the second user equipment which is sent by the first user equipment after the first user equipment determines that the broadcast information of the second user equipment is broadcast information in the broadcast information list.

17. A user equipment, comprising:
  a sending module, adapted to send a proximity service request to a proximity service server, wherein the proximity service request sent by the sending module carries an equipment identifier of the user equipment;
  a receiving module, adapted to receive a success response sent by the proximity service server with respect to the proximity service request;
  a monitoring module, adapted to monitor and obtain, after the receiving module receives the success response, broadcast information of at least one user equipment which is broadcast by the at least one user equipment other than the user equipment; and
  a registering module, adapted to register the broadcast information monitored and obtained by the monitoring module with the proximity service server, so that the proximity service server converts the broadcast information of the at least one user equipment into an equipment identifier of the at least one user equipment according to a correspondence between the equipment identifier of the at least one user equipment and the broadcast information of the at least one user equipment stored by the proximity service server and stores the equipment identifier of the at least one user equipment into a proximate equipment identifier list of the user equipment.

18. The user equipment according to claim 17, further comprising a second receiving module, wherein:
  the second receiving module is adapted to receive a broadcast information list of an equipment set to be monitored by the user equipment, which is sent by the mobility management entity, wherein the broadcast information list of the equipment set to be monitored by the user equipment is sent to the mobility management entity by the proximity service server; and
  the registering module is specifically-adapted to register the broadcast information monitored and obtained by the monitoring module with the proximity service server through the mobility management entity after it is determined that the broadcast information monitored and obtained by the monitoring module is broadcast information in the broadcast information list.

19. A proximity service server, comprising:
  a first receiving module, adapted to receive a proximity service request sent by a first user equipment, wherein the proximity service request sent by the first user equipment carries an equipment identifier of the first user equipment, and receive broadcast information of a second user equipment which is monitored and obtained by the first user equipment and sent by the first user equipment;

a first sending module, adapted to send a success response corresponding to the proximity service request to the first user equipment;

a first converting module, adapted to convert the broadcast information of the second user equipment into an equipment identifier of the second user equipment according to a correspondence between the equipment identifier of the second user equipment and the broadcast information of the second user equipment stored by the proximity service server; and a first storing module, adapted to store the equipment identifier of the second user equipment into a proximate equipment identifier list of the first user equipment.

20. The proximity service server according to claim 19, further comprising: an allocating module;

wherein the first receiving module is further adapted to receive a proximity service request sent by the second user equipment, wherein the proximity service request sent by the second user equipment carries the equipment identifier of the second user equipment; and the allocating module is adapted to allocate the broadcast information to the second user equipment, store the correspondence between the equipment identifier of the second user equipment and the broadcast information of the second user equipment, and send the broadcast information of the second user equipment to the second user equipment.

* * * * *